US010333854B2

(12) United States Patent
Chen et al.

(10) Patent No.: US 10,333,854 B2
(45) Date of Patent: Jun. 25, 2019

(54) METHOD AND APPARATUS FOR DETECTING TYPE OF NETWORK DATA FLOW

(71) Applicant: Huawei Technologies Co., Ltd., Shenzhen (CN)

(72) Inventors: Zhitang Chen, Hong Kong (CN); Yanhui Geng, Hong Kong (CN); Pascal Poupart, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 66 days.

(21) Appl. No.: 15/465,757

(22) Filed: Mar. 22, 2017

(65) Prior Publication Data
US 2017/0195240 A1 Jul. 6, 2017

Related U.S. Application Data

(63) Continuation of application No. PCT/CN2015/086515, filed on Aug. 10, 2015.

(30) Foreign Application Priority Data

Jan. 4, 2015 (CN) .......................... 2015 1 0003825

(51) Int. Cl.
*G06F 7/556* (2006.01)
*H04L 29/06* (2006.01)
(Continued)

(52) U.S. Cl.
CPC .......... *H04L 47/2483* (2013.01); *G06F 7/556* (2013.01); *H04L 43/00* (2013.01);
(Continued)

(58) Field of Classification Search
CPC ..... H04L 47/2483; H04L 69/22; H04L 43/16; H04L 45/70; H04L 43/00; G06F 7/556
(Continued)

(56) References Cited

U.S. PATENT DOCUMENTS 8,418,249 B1 * 4/2013 Nucci ................... G06F 21/552
706/20
2004/0093513 A1 5/2004 Cantrell et al.
(Continued)

FOREIGN PATENT DOCUMENTS

CN 101459554 A 6/2009
CN 101741744 A 6/2010
(Continued)

OTHER PUBLICATIONS

Estimation of Flow Lengths from Sampled Traffic, Lily et. al., University of Michigan, 2006 (Year: 2006).*
(Continued)

*Primary Examiner* — Marcus Smith
*Assistant Examiner* — Mohammed S Chowdhury
(74) *Attorney, Agent, or Firm* — Conley Rose, P.C.

(57) ABSTRACT

A method for detecting a data flow type includes obtaining a header of a first data packet of a current data flow and a pattern vector of the current data flow from the header; comparing the at least one feature dimension in the pattern vector of the current data flow with a corresponding feature dimension in a pattern vector of at least one historical data flow, so as to obtain at least one pattern similarity of the current data flow; predicting a length of the current data flow according to the at least one pattern similarity of the current data flow and a length of the corresponding at least one historical data flow; and comparing the predicted length of the current data flow with a preset threshold, and determining whether the current data flow is a large data flow or a small data flow according to a comparison result.

14 Claims, 6 Drawing Sheets

(51) Int. Cl.
*H04L 12/721* (2013.01)
*H04L 12/26* (2006.01)
*H04L 12/851* (2013.01)

(52) U.S. Cl.
CPC .............. *H04L 43/16* (2013.01); *H04L 45/70* (2013.01); *H04L 69/22* (2013.01)

(58) Field of Classification Search
USPC ........................................................ 370/235
See application file for complete search history.

(56) References Cited

U.S. PATENT DOCUMENTS

| 2007/0192863 A1* | 8/2007 | Kapoor | ................... G06F 9/505 |
| | | | 726/23 |
| 2016/0021141 A1* | 1/2016 | Liu | ..................... H04L 63/1433 |
| | | | 726/23 |

FOREIGN PATENT DOCUMENTS

| CN | 104038389 A | 9/2014 |
| CN | 104158753 A | 11/2014 |
| WO | 2012121635 A1 | 9/2012 |

OTHER PUBLICATIONS

Zhou, A., et al., "High-Speed Network Traffic Measurement Method," Journal of Software, 2014, No. 1, Jul. 25, 2013, 2 pages.

Foreign Communication From a Counterpart Application, Chinese Application No. 201510003825.3, Chinese Search Report dated May 25, 2018, 2 pages.

Foreign Communication From a Counterpart Application, Chinese Application No. 201510003825.3, Chinese Office Action dated Jun. 5, 2018, 5 pages.

Zhou, R., et al., "Datacenter Network Large Flow Detection and Scheduling from the Edge," 2014, 14 pages.

Mori, T., et al., "Identifying Elephant Flows Through Periodically Sampled Packets," IMC, Oct. 25-27, 2004, 6 pages.

Loiseau, P., et al., "Maximum Likelihood Estimation of the Flow Size Distribution Tail Index for Sampled Packet Data," SIGMETRICS/Performance, Jun. 15-19, 2009, 11 pages.

Coull, S., et al., "On Measuring the Similarity of Network Hosts: Pitfalls, New Metrics, and Empirical Analyses," NDSS Symposium, Feb. 8, 2011, 16 pages.

Guang, C., et al., "Online Identifying Elephant Flows through a Scalable Non-uniform Sampling Algorithm," 11th IEEE International Conference on Communication Technology Proceedings, 2008, pp. 525-528.

Foreign Communication From a Counterpart Application, European Application No. 15874869.9, Extended European Search Report dated Jul. 11, 2017, 7 pages.

Foreign Communication From a Counterpart Application, PCT Application No. PCT/CN2015/086515, English Translation of International Search Report dated Nov. 10, 2015, 2 pages.

Foreign Communication From a Counterpart Application, PCT Application No. PCT/CN2015/086515, English Translation of Written Opinion dated Nov. 10, 2015, 5 pages.

* cited by examiner

METHOD AND APPARATUS FOR DETECTING TYPE OF NETWORK DATA FLOW

CROSS-REFERENCE TO RELATED APPLICATIONS

This application is a continuation of International Application No. PCT/CN2015/086515, filed on Aug. 10, 2015, which claims priority to Chinese Patent Application No. 201510003825.3, filed on Jan. 4, 2015, both of which are hereby incorporated by reference in their entireties.

TECHNICAL FIELD

Embodiments of the present application relate to the field of network data routing, and in particular, to a method and an apparatus for detecting a type of a network data flow, and a network data routing method and apparatus to which the method and the apparatus are applied.

BACKGROUND

Recent research indicates that, in a data center network, about 90% of data flows belong to small data flows, also referred to as mice flows, that burst, have short duration, and have a very small flow length; and only 10% of data flows belong to large data flows, also referred to as elephant flows, that have long duration and have a huge flow length. A quantity of the elephant flows accounts only for 10% of a quantity of data flows of the entire network, but traffic of the elephant flows (such as, a quantity of data packets, or a total quantity of data flow bytes) accounts for 90% of total traffic of the entire data center network. According to an existing routing algorithm, such as Equal Cost Multi-Path (ECMP), data flows are routed and forwarded mostly using local information of a network, and therefore paths of these elephant flows are very likely to overlap, that is, different elephant flows use a same network link. Because bandwidth of the network link is limited, when multiple elephant flows use the same link, a case of network congestion occurs. On the contrary, some links are in a state of low utilization or even in an idle state. Occurrence of network congestion severely deteriorates running performance of this network, particularly for some data flows very sensitive to delay, such as voice communication.

An effective method for resolving the foregoing problem is: with reference to a global status of a network, a best route is selected for each data flow, and data flows are evenly distributed into the entire network, so as to avoid network congestion, and implement network load balancing. However, a quantity of data flows of a data center is huge, and for route optimization performed on each to-be-forwarded data flow, calculation complexity is huge, and feasibility is low. It is known that, 90% of traffic of the entire network results from elephant flows and a quantity of the elephant flows accounts only for 10% of a total quantity of data flows of the entire network. If a best route can be selected for the elephant flows, performance of the entire data center network may be well optimized. Dynamic route planning performed on the elephant flows, and selection of an optimal path for the elephant flows require that the elephant flows and mice flows be distinguished. Some existing techniques may be used for distinguishing the elephant flows and the mice flows. For example, periodic polling is a simple and direct solution for identifying the elephant flows. A principle of the solution is to collect statistics on a to-be-identified flow, for example, when traffic of the flow exceeds a threshold, or when duration of the flow exceeds a threshold, it is considered that the data flow is an elephant flow. However, a quantity of data flows in a network is huge, and therefore if traffic statistics are collected on each data flow, time and space overheads of the traffic statistics are both very huge, that is, a determining result is hysteretic, and very large buffer space is needed. Moreover, in an improved solution, initial screening is performed on data flows according to some priori knowledge, and traffic statistics are collected on data flows meeting a screening condition. The initial screening is generally performed by setting a flow table, and the flow table generally includes a port number, or an Internet Protocol (IP) address, or a transport protocol. If information about a flow matches one item of the flow table, or matches all items of the flow table, the data flow is forwarded to a traffic statistics collecting module for collecting traffic statistics, and if traffic of the flow exceeds a threshold, it is considered that the flow is an elephant flow, and a routing module selects an optimal path for the flow. However, in this method, a threshold needs to be preset, and a determining result cannot adapt to dynamic network changes, so that the determining result is imprecise.

SUMMARY

Embodiments of the present application provide a method and an apparatus for detecting a type of a network data flow, so as to determine a type of a network data flow in real time and improve determining precision.

According to a first aspect, an embodiment of the present application provides a method for detecting a type of a data flow, where the method includes: obtaining a header of a first data packet of a current data flow, and obtaining a pattern vector of the current data flow from the header, where the pattern vector includes at least one feature dimension, and the at least one feature dimension is selected from an information combination including a source IP address, a server port, a destination IP address, and a client port of the current data flow, a transmission time of the current data flow, and a transport protocol used by the current data flow; comparing the at least one feature dimension in the pattern vector of the current data flow with a corresponding feature dimension in a pattern vector of at least one historical data flow, so as to obtain at least one pattern similarity of the current data flow, where the at least one pattern similarity of the current data flow and the pattern vector of the at least one historical data flow are in a one-to-one correspondence, and the pattern vector of the historical data flow is pre-stored in a database; predicting a length of the current data flow according to the at least one pattern similarity of the current data flow and a length of the corresponding at least one historical data flow, where the length of the at least one historical data flow is pre-stored in the database, and the length of the at least one historical data flow and the pattern vector of the at least one historical data flow are in a one-to-one correspondence; and comparing the predicted length of the current data flow with a preset threshold, and determining whether the current data flow is a large data flow or a small data flow according to a comparison result.

With reference to the first aspect, in a first possible implementation manner of the first aspect, the comparing the at least one feature dimension in the pattern vector of the current data flow with a corresponding feature dimension in a pattern vector of at least one historical data flow, so as to obtain at least one pattern similarity of the current data flow includes: estimating a distance measure between the at least one feature dimension in the pattern vector of the current data flow and the corresponding feature dimension in the pattern vector of the at least one historical data flow; estimating a feature dimension similarity corresponding to the at least one feature dimension in the pattern vector of the current data flow according to the distance measure; and obtaining the at least one pattern similarity of the current data flow according to the feature dimension similarity, where the at least one pattern similarity and the at least one historical data flow are in a one-to-one correspondence.

With reference to the first possible implementation manner of the first aspect, in a second possible implementation manner of the first aspect, the estimating a distance measure between the at least one feature dimension in the pattern vector of the current data flow and the corresponding feature dimension in the pattern vector of the at least one historical data flow includes: separately estimating an IP address distance measure, a port distance measure, a transmission time distance measure, and a transport protocol distance measure between the at least one feature dimension in the pattern vector of the current data flow and the corresponding feature dimension in the pattern vector of the at least one historical data flow, where the IP address distance measure is estimated using the source IP address in the pattern vector of the current data flow and a source IP address in the pattern vector of the historical data flow, or estimated using the destination IP address in the pattern vector of the current data flow and a destination IP address in the pattern vector of the historical data flow, or estimated using the source IP address and the destination IP address in the pattern vector of the current data flow and a source IP address and a destination IP address in the pattern vector of the historical data flow; the port distance measure is estimated using the server port in the pattern vector of the current data flow and a server port in the pattern vector of the historical data flow, or estimated using the client port in the pattern vector of the current data flow and a client port in the pattern vector of the historical data flow, or estimated using the server port and the client port in the pattern vector of the current data flow and a client port and a server port in the pattern vector of the historical data flow; the transmission time distance measure is estimated using the transmission time, of the current data flow, in the pattern vector of the current data flow and a transmission time, of the historical data flow, in the pattern vector of the historical data flow; and the transport protocol distance measure is estimated using the transport protocol, used by the current data flow, in the pattern vector of the current data flow and a transport protocol, used by the historical data, in the pattern vector of the historical data flow; and correspondingly, the estimating a feature dimension similarity corresponding to the at least one feature dimension in the pattern vector of the current data flow according to the distance measure includes: separately estimating an IP address similarity, a port similarity, a transmission time similarity, and a transport protocol similarity that are corresponding to the at least one feature dimension in the pattern vector of the current data flow according to the IP address distance measure, the port distance measure, the transmission time distance measure, and the transport protocol distance measure.

With reference to the second possible implementation manner of the first aspect, in a third possible implementation manner of the first aspect, the IP address distance measure is obtained using the following formula:

$$d_{ip}(x_{1,ip}, x_{2,ip}) = \log \frac{33}{LPL(x_{1,ip}, x_{2,ip}) + 1}$$

where $x_{1,ip}$ is the source IP address or the destination IP address of the current data flow, $x_{2,ip}$ is the source IP address or the destination IP address of the historical data flow, $d_{ip}(x_{1,ip},x_{2,ip})$ is the IP address distance measure, and LPL $(x_{1,ip},x_{2,ip})$ is a longest prefix length between the source IP address or the destination IP address of the current data flow and the source IP address or the destination IP address of the historical data flow; the port distance measure is obtained using the following formula:

$$d_{prt}(x_{1,port}, x_{2,port}) = \begin{cases} 0 & \text{if } x_{1,port} = x_{2,port} \\ 1 & \text{if } \delta_{port}(x_{1,port}) = \delta_{port}(x_{2,port}) \\ 2 & \text{if } \delta_{port}(x_{1,port}) \in \{0, 1\} \& \delta_{port}(x_{2,port}) \in \{0, 1\} \\ 4 & \text{if } \delta_{port}(x_{1,port}) \in \{0, 1\} \& \delta_{port}(x_{2,port}) = \\ & 2 \mid \delta_{port}(x_{1,port}) = 2 \& \delta_{port}(x_{2,port}) \in \{0, 1\} \end{cases}$$

where $x_{1,port}$ is the server port or the client port of the current data flow, $x_{2,port}$ is the server port or the client port of the historical data flow, $d_{prt}(x_{1,port},x_{2,port})$ is the port distance measure, and $\delta_{port}(x)$ is obtained using the following formula:

$$\delta_{port}(x) = \begin{cases} 0 & \text{if } x \in [0, 1023] \\ 1 & \text{if } x \in [1024, 49151] \\ 2 & \text{if } x \in [49152, 65535] \end{cases}$$

where $\delta_{port}(x)$ is a value assigned to a range type to which the server port or the client port belongs, and x is a value of the server port or the client port; the transmission time distance measure is obtained using the following formula:

$$d_t(x_{1,t},x_{2,t})=|x_{1,t}-x_{2,t}|$$

where $x_{1,t}$ denotes the transmission time of the current data flow, $x_{2,t}$ denotes the transmission time of the historical data flow, and $d_t(x_{1,t},x_{2,t})$ denotes the transmission time distance measure; and the transport protocol distance measure is obtained using the following formula:

$$d_{prtcl}(x_{1,prtcl},x_{2,prtcl})=\|x_{1,prtcl}-x_{1,prtcl}\|_2$$

where $x_{1,prtcl}$ is the transport protocol used by the current data flow, $x_{2,prtcl}$ is the protocol used by the historical data flow, and $d_{prtcl}(x_{1,prtcl},x_{2,prtcl})$ is the transport protocol distance measure.

With reference to the second or third possible implementation manner of the first aspect, in a fourth possible implementation manner of the first aspect, the separately estimating an IP address similarity, a port similarity, a transmission time similarity, and a transport protocol similarity that are corresponding to the at least one feature dimension in the pattern vector of the current data flow according to the IP address distance measure, the port distance measure, the transmission time distance measure, and the transport protocol distance measure includes: separately estimating, by following a rule that a smaller distance measure between feature dimensions indicates a higher feature dimension similarity, the IP address similarity, the port similarity, the transmission time similarity, and the transport protocol similarity that are corresponding to the at least one feature dimension in the pattern vector of the current data flow according to the IP address distance measure, the port distance measure, the transmission time distance measure, and the transport protocol distance measure.

With reference to any one of the second to fourth possible implementation manners of the first aspect, in a fifth possible implementation manner of the first aspect, the separately estimating an IP address similarity, a port similarity, a transmission time similarity, and a transport protocol similarity that are corresponding to the at least one feature dimension in the pattern vector of the current data flow according to the IP address distance measure, the port distance measure, the transmission time distance measure, and the transport protocol distance measure includes: obtaining the IP address similarity, the port similarity, the transmission time similarity, and the transport protocol similarity using the following formula:

$$k_f(x_{1,f}, x_{2,f}, \theta_f) = \exp\left[-\frac{d_f(x_{1,f}, x_{2,f})}{\theta_f}\right]$$

where $k_f(x_{1,f}, x_{2,f}, \theta_f)$ is the feature dimension similarity, $x_{1,f}$ is one of the at least one feature dimension in the pattern vector of the current data flow, $x_{2,f}$ is a feature dimension, in the pattern vector of the historical data flow, corresponding to one of the at least one feature dimension in the pattern vector of the current data flow, $\theta_f$ is a parameter of a similarity function of one of the at least one feature dimension, and a value of the parameter decides a speed at which the similarity function decreases as a distance measure increases, and also decides a weight that the feature dimension accounts for in data flow length prediction, $$f \in \underline{\{src\_ip, src\_prt, dest\_ip, dest\_prt, prtcl, t\}},$$
$$F$$

where F is a dimension that is corresponding to the feature dimension in the pattern vector of the current data flow and that is corresponding to the corresponding feature dimension in the pattern vector of the historical data flow.

With reference to the first aspect or any one of the foregoing possible implementation manners of the first aspect, in a sixth possible implementation manner of the first aspect, the obtaining the at least one pattern similarity of the current data flow according to the feature dimension similarity includes: using, according to a weight corresponding to the at least one feature dimension in the pattern vector of the current data flow, a feature dimension similarity corresponding to a feature dimension whose weight is highest of the at least one feature dimension in the pattern vector of the current data flow, as the at least one pattern similarity of the current data flow; or using, according to a weight corresponding to the at least one feature dimension in the pattern vector of the current data flow, a feature dimension similarity on which weighted combination is performed and that corresponds to the at least one feature dimension in the pattern vector of the current data flow, as the at least one pattern similarity of the current data flow.

With reference to the first aspect or any one of the foregoing possible implementation manners of the first aspect, in a seventh possible implementation manner of the first aspect, the using, according to a weight corresponding to the at least one feature dimension in the pattern vector of the current data flow, a feature dimension similarity on which weighted combination is performed and that corresponds to the at least one feature dimension in the pattern vector of the current data flow, as the at least one pattern similarity of the current data flow includes: performing weighted combination on the feature dimension similarity corresponding to the at least one feature dimension in the pattern vector of the current data flow using the following formula to obtain the at least one pattern similarity of the current data flow:

$$K(x_1, x_2, \theta_m) = \theta_m \prod_{f \in F} k_f(x_{1,f}, x_{2,f}, \theta_f)$$

where $K(x_1, x_2, \theta_m)$ is the at least one pattern similarity of the current data flow, $x_1$ is the current data flow, $x_2$ is the historical data flow, $\theta_m$ is a parameter deciding a similarity amplitude, $\theta_m \in \Theta$, $\Theta = [\theta_{src\_ip}\ \theta_{src\_prt} \ldots \theta_{at}\ \theta_{pt}\ \overline{\omega}_t]$, $\Theta$ is a vector that is obtained by means of training and that represents a transmission behavior pattern of the historical data flow in a network, $k_f(x_{1,f}, x_{2,f}, \theta_f)$ is the feature dimension similarity, $x_{1,f}$ is one of the at least one feature dimension in the pattern vector of the current data flow, $x_{2,f}$ is a feature dimension, in the pattern vector of the historical data flow, corresponding to one of the at least one feature dimension in the pattern vector of the current data flow, $\theta_f$ is a parameter of a similarity function of one of the at least one feature dimension, and a value of the parameter controls a speed at which the similarity function decreases as a distance measure increases, and also controls a weight that the feature dimension accounts for in data flow length prediction, $$f \in \underline{\{src\_ip, src\_prt, dest\_ip, dest\_prt, prtcl, t\}},$$
$$F$$

where F is a dimension that is corresponding to the feature dimension in the pattern vector of the current data flow and that is corresponding to the corresponding feature dimension in the pattern vector of the historical data flow.

With reference to the first aspect or any one of the foregoing possible implementation manners of the first aspect, in a eighth possible implementation manner of the first aspect, the predicting a length of the current data flow according to the at least one pattern similarity of the current data flow and a length of the corresponding at least one historical data flow includes: performing weighted combination on the length of the at least one historical data flow corresponding to the at least one pattern similarity according to the at least one pattern similarity of the current data flow to predict the length of the current data flow, where a weight of the length of the historical data flow when the weighted combination is performed is decided by the at least one pattern similarity corresponding to the at least one historical data flow.

With reference to the first aspect or any one of the foregoing possible implementation manners of the first aspect, in an ninth possible implementation manner of the first aspect, the performing weighted combination on the length of the at least one historical data flow corresponding to the at least one pattern similarity according to the at least one pattern similarity of the current data flow to predict the length of the current data flow includes: predicting the length of the current data flow using the following formula:

$$\hat{f}_* = \sum_{i=1}^{n} w_i y_i$$

where $\hat{f}_*$ is the predicted length of the current data flow, $w_i$ is a weight factor, whose size depends on the $i^{th}$ pattern similarity of the at least one pattern similarity of the current data flow, and the $i^{th}$ pattern similarity is a pattern similarity between the pattern vector of the current data flow and a pattern vector of the $i^{th}$ historical data flow of the at least one historical data flow, and $y_i$ is a length of the $i^{th}$ historical data flow of the at least one historical data flow.

With reference to the first aspect or any one of the foregoing possible implementation manners of the first aspect, in a tenth possible implementation manner of the first aspect, the weighting factor $w_i$ is obtained using the following formula:

$$w_i = g(K(x_*, x_i, \Theta))$$

where g is a prediction model, $K(x_*, x_i, \Theta)$ is the $i^{th}$ pattern similarity, $\Theta$ is a vector that is obtained by means of training and that represents a transmission behavior pattern of the historical data flow in a network, $\Theta = [\theta_{src\ ip}\ \theta_{src\ prt} \cdots \theta_{at}\ \theta_{pt}\ \bar{\omega}_t]$, $x_*$ is the pattern vector of the current data flow, and $x_i$ is the pattern vector of the $i^{th}$ historical data flow of the at least one historical data flow.

With reference to the first aspect or any one of the foregoing possible implementation manners of the first aspect, in an eleventh possible implementation manner of the first aspect, the prediction model g is updated in real time according to a pattern vector and a length of a newly obtained historical data flow.

With reference to the first aspect or any one of the foregoing possible implementation manners of the first aspect, in a twelfth possible implementation manner of the first aspect, the performing weighted combination on the length of the at least one historical data flow corresponding to the at least one pattern similarity according to the at least one pattern similarity of the current data flow to predict the length of the current data flow includes: predicting the length of the current data flow using the following formula:

$$\hat{f}_* = K(x_*, X_m)[K_{mn}K_{nm} + \sigma_n^2 K_{mm}]^{-1} K_{mn} y$$

where $x_*$ is the pattern vector of the current data flow; $X_m$ is a pattern vector of a historical data flow subset of the at least one historical data flow, and the subset includes m historical data flows; and $K(x_*, X_m)$ denotes a pattern similarity between the current data flow and the historical data flow subset, $K_{mn}$, $K_{mm}$, and $K_{nm}$ are submodules in a pattern similarity matrix K of the historical data flow, $$K = \begin{bmatrix} K_{mm} & K_{m(n-m)} \\ K_{(n-m)m} & K_{(n-m)(n-m)} \end{bmatrix},$$

$$K_{mn} = \lfloor K_{mm}\ K_{m(n-m)} \rfloor,$$

$$K_{mm} = \begin{bmatrix} K_{mm} \\ K_{(n-m)m} \end{bmatrix},$$

an element of the $i^{th}$ row and the $j^{th}$ column of the pattern similarity matrix K of the historical data flow denotes a pattern similarity between the $i^{th}$ historical data flow and the $j^{th}$ historical data flow in the historical data flow subset, y is a flow length of a historical data flow, and $\sigma_n^2$ denotes a model noise variance.

With reference to the first aspect or any one of the foregoing possible implementation manners of the first aspect, in a thirteenth possible implementation manner of the first aspect, the formula $\hat{f}_* = K(x_*, X_m)[K_{mn}K_{nm} + \sigma_n^2 K_{mm}]^{-1} K_{mn} y$ used for predicting the length of the current data flow is updated in real time according to a pattern vector and a length of a newly obtained historical data flow to:

$$\hat{f}_* = K(x_*, X)\alpha_{n+1}$$

where $$\alpha_{n+1} = \left(I - \frac{\Pi_n k_{n+1} k_{n+1}^T}{1 + k_{n+1}^T \Pi_n k_{n+1}}\right)\alpha_n + y_{n+1}\left(I - \frac{\Pi_n k_{n+1} k_{n+1}^T}{1 + k_{n+1}^T \Pi_n k_{n+1}}\right)\Pi_n k_{n+1},$$

$$K_{(n+1)m} = \begin{bmatrix} K_{nm} \\ k_{n+1}^T \end{bmatrix},$$

$$\Pi_n = (K_{mn}K_{nm} + \sigma_n^2 K_{mm})^{-1},$$

$$\Pi_{n+1} = (K_{m(n+1)}K_{(n+1)m} + \sigma_n^2 K_{mm})^{-1} = \Pi_n - \frac{\Pi_n k_{n+1} k_{n+1}^T \Pi_n}{1 + k_{n+1}^T \Pi_n k_{n+1}},$$

$$\alpha_n = [K_{mn}K_{nm} + \sigma_n^2 K_{mm}]^{-1} y.$$

With reference to the first aspect or any one of the foregoing possible implementation manners of the first aspect, in a fourteenth possible implementation manner of the first aspect, the threshold is updated in real time according to a newly obtained historical data flow.

With reference to the first aspect or any one of the foregoing possible implementation manners of the first aspect, in a fifteenth possible implementation manner of the first aspect, the updating the threshold in real time according to a newly obtained historical data flow is implemented using the following steps: establishing a cumulative distribution function based on a data flow length sample of the historical data flow, and obtaining the preset threshold according to the cumulative distribution function, where the historical data flow includes the at least one historical data flow corresponding to the at least one pattern similarity of the current data flow; and modifying the cumulative distribution function and the preset threshold according to a data flow length sample of the newly obtained historical data flow.

According to a second aspect, an embodiment of the present application provides an apparatus for detecting a type of a data flow, where the apparatus includes: an information obtaining module configured to obtain a header of a first data packet of a current data flow, and obtain a pattern vector of the current data flow from the header, where the pattern vector includes at least one feature dimension, and the at least one feature dimension is selected from an information combination including a source IP address, a server port, a destination IP address, and a client port of the current data flow, a transmission time of the current data flow, and a transport protocol used by the current data flow; a pattern similarity calculation module configured to compare the at least one feature dimension in the pattern vector of the current data flow with a corresponding feature dimension in a pattern vector of at least one historical data flow, so as to obtain at least one pattern similarity of the current data flow, where the at least one pattern similarity of the current data flow and the pattern vector of the at least one historical data flow are in a one-to-one correspondence, and the pattern vector of the historical data flow is pre-stored in a database; a data flow length prediction module configured to predict a length of the current data flow according to the at least one pattern similarity of the current data flow and a length of the corresponding at least one historical data flow, where the length of the at least one historical data flow is pre-stored in the database, and the length of the at least one historical data flow and the pattern vector of the at least one historical data flow are in a one-to-one correspondence; and a data flow type detection module configured to compare the predicted length of the current data flow with a preset threshold, and determine whether the current data flow is a large data flow or a small data flow according to a comparison result.

With reference to the second aspect, in a first possible implementation manner of the second aspect, the pattern similarity calculation module includes: a distance measurement unit configured to estimate a distance measure between the at least one feature dimension in the pattern vector of the current data flow and the corresponding feature dimension in the pattern vector of the at least one historical data flow; a feature dimension similarity estimation unit configured to estimate a feature dimension similarity corresponding to the at least one feature dimension in the pattern vector of the current data flow according to the distance measure; and a pattern similarity obtaining unit configured to obtain the at least one pattern similarity of the current data flow according to the feature dimension similarity, where the at least one pattern similarity and the at least one historical data flow are in a one-to-one correspondence.

With reference to the first possible implementation manner of the second aspect, in a second possible implementation manner of the second aspect, the distance estimation unit is configured to: separately estimate an IP address distance measure, a port distance measure, a transmission time distance measure, and a transport protocol distance measure between the at least one feature dimension in the pattern vector of the current data flow and the corresponding feature dimension in the pattern vector of the at least one historical data flow, where the IP address distance measure is estimated using the source IP address in the pattern vector of the current data flow and a source IP address in the pattern vector of the historical data flow, or estimated using the destination IP address in the pattern vector of the current data flow and a destination IP address in the pattern vector of the historical data flow, or estimated using the source IP address and the destination IP address in the pattern vector of the current data flow and a source IP address and a destination IP address in the pattern vector of the historical data flow; the port distance measure is estimated using the server port in the pattern vector of the current data flow and a server port in the pattern vector of the historical data flow, or estimated using the client port in the pattern vector of the current data flow and a client port in the pattern vector of the historical data flow, or estimated using the server port and the client port in the pattern vector of the current data flow and a client port and a server port in the pattern vector of the historical data flow; the transmission time distance measure is estimated using the transmission time, of the current data flow, in the pattern vector of the current data flow and a transmission time, of the historical data flow, in the pattern vector of the historical data flow; and the transport protocol distance measure is estimated using the transport protocol, used by the current data flow, in the pattern vector of the current data flow and a transport protocol, used by the historical data, in the pattern vector of the historical data flow; and correspondingly, the feature dimension similarity estimation unit is configured to: separately estimate an IP address similarity, a port similarity, a transmission time similarity, and a transport protocol similarity that are corresponding to the at least one feature dimension in the pattern vector of the current data flow according to the IP address distance measure, the port distance measure, the transmission time distance measure, and the transport protocol distance measure.

With reference to the second possible implementation manner of the second aspect, in a third possible implementation manner of the second aspect, the IP address distance measure is obtained using the following formula:

$$d_{ip}(x_{1,ip}, x_{2,ip}) = \log\frac{33}{LPL(x_{1,ip}, x_{2,ip}) + 1}$$

where $x_{1,ip}$ is the source IP address or the destination IP address of the current data flow, $x_{2,ip}$ is the source IP address or the destination IP address of the historical data flow, $d_{ip}(x_{1,ip}, x_{2,ip})$ is the IP address distance measure, and $LPL(x_{1,ip}, x_{2,ip})$ is a longest prefix length between the source IP address or the destination IP address of the current data flow and the source IP address or the destination IP address of the historical data flow; the port distance measure is obtained using the following formula:

$$d_{prt}(x_{1,port}, x_{2,port}) = \begin{cases} 0 & \text{if } x_{1,port} = x_{2,port} \\ 1 & \text{if } \delta_{port}(x_{1,port}) = \delta_{port}(x_{2,port}) \\ 2 & \text{if } \delta_{port}(x_{1,port}) \in \{0, 1\} \,\&\, \delta_{port}(x_{2,port}) \in \{0, 1\} \\ 4 & \text{if } \delta_{port}(x_{1,port}) \in \{0, 1\} \,\&\, \delta_{port}(x_{2,port}) = 2 \mid \delta_{port}(x_{1,port}) = 2 \,\&\, \delta_{port}(x_{2,port}) \in \{0, 1\} \end{cases}$$

where $x_{1,port}$ is the server port or the client port of the current data flow, $x_{2,port}$ is the server port or the client port of the historical data flow, $d_{prt}(x_{1,port}, x_{2,port})$ is the port distance measure, and $\delta_{port}(x)$ is obtained using the following formula:

$$\delta_{port}(x) = \begin{cases} 0 & \text{if } x \in [0, 1023] \\ 1 & \text{if } x \in [1024, 49151] \\ 2 & \text{if } x \in [49152, 65535] \end{cases}$$

where $\delta_{port}(x)$ is a value assigned to a range type to which the server port or the client port belongs, and x is a value of the server port or the client port; the transmission time distance measure is obtained using the following formula:

$$d_t(x_{1,t}, x_{2,t}) = |x_{1,t} - x_{2,t}|$$

where $x_{1,t}$ denotes the transmission time of the current data flow, $x_{2,t}$ denotes the transmission time of the historical data flow, and $d_t(x_{1,t}, x_{2,t})$ denotes the transmission time distance measure; and the transport protocol distance measure is obtained using the following formula:

$$d_{prtcl}(x_{1,prtcl}, x_{2,prtcl}) = \|x_{1,prtcl} - x_{1,prtcl}\|_2$$

where $x_{1,prtcl}$ is the transport protocol used by the current data flow, $x_{2,prtcl}$ is the protocol used by the historical data flow, and $d_{prtcl}(x_{1,prtcl}, x_{2,prtcl})$ is the transport protocol distance measure.

With reference to the second aspect or any one of the foregoing possible implementation manners of the second aspect, in a fourth possible implementation manner of the second aspect, the feature dimension similarity estimation unit is configured to separately estimate, by following a rule that a smaller distance measure between feature dimensions indicates a higher feature dimension similarity, the IP address similarity, the port similarity, the transmission time similarity, and the transport protocol similarity that are corresponding to the at least one feature dimension in the pattern vector of the current data flow according to the IP address distance measure, the port distance measure, the transmission time distance measure, and the transport protocol distance measure.

With reference to the second aspect or any one of the foregoing possible implementation manners of the second aspect, in a fifth possible implementation manner of the second aspect, the feature dimension similarity estimation unit is configured to: obtain the IP address similarity, the port similarity, the transmission time similarity, and the transport protocol similarity using the following formula:

$$k_f(x_{1,f}, x_{2,f}, \theta_f) = \exp\left[-\frac{d_f(x_{1,f}, x_{2,f})}{\theta_f}\right]$$

where $k_f(x_{1,f}, x_{2,f}, \theta_f)$ is the feature dimension similarity, $x_{1,f}$ is one of the at least one feature dimension in the pattern vector of the current data flow, $x_{2,f}$ is a feature dimension, in the pattern vector of the historical data flow, corresponding to one of the at least one feature dimension in the pattern vector of the current data flow, $\theta_f$ is a parameter of a similarity function of one of the at least one feature dimension, and a value of the parameter decides a speed at which the similarity function decreases as a distance measure increases, and also decides a weight that the feature dimension accounts for in data flow length prediction, $$f \in \underset{F}{\{src\_ip, src\_prt, dest\_ip, dest\_prt, prtcl, t\}},$$

where F is a dimension that is corresponding to the feature dimension in the pattern vector of the current data flow and that is corresponding to the corresponding feature dimension in the pattern vector of the historical data flow.

With reference to the second aspect or any one of the foregoing possible implementation manners of the second aspect, in a sixth possible implementation manner of the second aspect, the pattern similarity obtaining unit is configured to: use, according to a weight corresponding to the at least one feature dimension in the pattern vector of the current data flow, a feature dimension similarity corresponding to the feature dimension whose weight is highest of the at least one feature dimension in the pattern vector of the current data flow, as the at least one pattern similarity of the current data flow; or use, according to a weight corresponding to the at least one feature dimension in the pattern vector of the current data flow, a feature dimension similarity on which weighted combination is performed and that corresponds to the at least one feature dimension in the pattern vector of the current data flow, as the at least one pattern similarity of the current data flow.

With reference to the second aspect or any one of the foregoing possible implementation manners of the second aspect, in a seventh possible implementation manner of the second aspect, the pattern similarity obtaining unit performs weighted combination on the feature dimension similarity corresponding to the at least one feature dimension in the pattern vector of the current data flow using the following formula to obtain the at least one pattern similarity of the current data flow:

$$K(x_1, x_2, \theta_m) = \theta_m \prod_{f \in F} k_f(x_{1,f}, x_{2,f}, \theta_f)$$

where $K(x_1, x_2, \theta_m)$ is the at least one pattern similarity of the current data flow, $x_1$ is the current data flow, $x_2$ is the historical data flow, $\theta_m$ is a parameter deciding a similarity amplitude, $\theta_m \in \Theta$; $\Theta = [\theta_{src\_ip}\ \theta_{src\_prt} \ldots \theta_{at}\ \theta_{pt}\ \overline{\omega}_t]$, $\Theta$ is a vector that is obtained by means of training and that represents a transmission behavior pattern of the historical data flow in a network, $k_f(x_{1,f}, x_{2,f}, \theta_f)$ is the feature dimension similarity, $x_{1,f}$ is one of the at least one feature dimension in the pattern vector of the current data flow, $x_{2,f}$ is a feature dimension, in the pattern vector of the historical data flow, corresponding to one of the at least one feature dimension in the pattern vector of the current data flow, $\theta_f$ is a parameter of a similarity function of one of the at least one feature dimension, and a value of the parameter controls a speed at which the similarity function decreases as a distance measure increases, and also controls a weight that the feature dimension accounts for in data flow length prediction, $$f \in \underset{F}{\{src\_ip, src\_prt, dest\_ip, dest\_prt, prtcl, t\}},$$

where F is a dimension that is corresponding to the feature dimension in the pattern vector of the current data flow and that is corresponding to the corresponding feature dimension in the pattern vector of the historical data flow.

With reference to the second aspect or any one of the foregoing possible implementation manners of the second aspect, in an eighth possible implementation manner of the second aspect, the data flow length prediction module is configured to: perform weighted combination on the length of the at least one historical data flow corresponding to the at least one pattern similarity according to the at least one pattern similarity of the current data flow to predict the length of the current data flow, where a weight of the length of the historical data flow when the weighted combination is performed is decided by the at least one pattern similarity corresponding to the at least one historical data flow.

With reference to the second aspect or any one of the foregoing possible implementation manners of the second aspect, in a ninth possible implementation manner of the second aspect, the data flow length prediction module is configured to: predict the length of the current data flow using the following formula:

$$\hat{f}_* = \sum_{i=1}^{n} w_i y_i$$

where $\hat{f}_*$ is the predicted length of the current data flow, $w_i$ is a weight factor, whose size depends on the $i^{th}$ pattern similarity of the at least one pattern similarity of the current data flow, and the $i^{th}$ pattern similarity is a pattern similarity between the pattern vector of the current data flow and a pattern vector of the $i^{th}$ historical data flow of the at least one historical data flow, and $y_i$ is a length of the $i^{th}$ historical data flow of the at least one historical data flow.

With reference to the second aspect or any one of the foregoing possible implementation manners of the second aspect, in a tenth possible implementation manner of the second aspect, the weighting factor $w_i$ is obtained using the following formula:

$$w_i = g(K(x_*, x_i, \Theta))$$

where g is a prediction model, $K(x_*, x_i, \Theta)$ is the $i^{th}$ pattern similarity, $\Theta$ is a vector that is obtained by means of training and that represents a transmission behavior pattern of the historical data flow in a network, $\Theta = [\theta_{src\ ip}\ \theta_{src\ prt} \cdots \theta_{at}\ \theta_{pt}\ \overline{\omega}_t]$, $x_*$ is the pattern vector of the current data flow, and $x_i$ is the pattern vector of the $i^{th}$ historical data flow of the at least one historical data flow.

With reference to the second aspect or any one of the foregoing possible implementation manners of the second aspect, in an eleventh possible implementation manner of the second aspect, the prediction model g is updated in real time according to a pattern vector and a length of a newly obtained historical data flow.

With reference to the second aspect or any one of the foregoing possible implementation manners of the second aspect, in a twelfth possible implementation manner of the second aspect, the data flow length prediction module is configured to: predict the length of the current data flow using the following formula:

$$\hat{f}_* = K(x_*, X_m)[K_{mn}K_{nm} + \sigma_n^2 K_{mm}]^{-1} K_{mn} y$$

where $x_*$ is the pattern vector of the current data flow; $X_m$ is a pattern vector of a historical data flow subset of the at least one historical data flow, and the subset includes m historical data flows; and $K(x_*, X_m)$ denotes a pattern similarity between the current data flow and the historical data flow subset, $K_{mn}$, $K_{mm}$, and $K_{nm}$ are submodules in a pattern similarity matrix K of the historical data flow, $$K = \begin{bmatrix} K_{mn} & K_{m(n-m)} \\ K_{(n-m)m} & K_{(n-m)(n-m)} \end{bmatrix}, K_{mn} = \lfloor K_{mm}\ K_{m(n-m)} \rfloor,$$

$$K_{nm} = \begin{bmatrix} K_{mn} \\ K_{(n-m)m} \end{bmatrix},$$

an element of the $i^{th}$ row and the $j^{th}$ column of the pattern similarity matrix K of the historical data flow subset denotes a pattern similarity between the $i^{th}$ historical data flow and the $j^{th}$ historical data flow in the historical data flow subset, y is a flow length of a historical data flow, and $\sigma_n^2$ denotes a model noise variance.

With reference to the second aspect or any one of the foregoing possible implementation manners of the second aspect, in a thirteenth possible implementation manner of the second aspect, the formula $\hat{f}_* = K(x_*, X_m)[K_{mn}K_{nm} + \sigma_n^2 K_{mm}]^{-1} K_{mn} y$ used for predicting the length of the current data flow is updated in real time according to a pattern vector and a length of a newly obtained historical data flow to:

$$\hat{f}_* = K(x_*, X)\alpha_{n+1}$$

where $$\alpha_{n+1} = \left(I - \frac{\Pi_n k_{n+1} k_{n+1}^T}{1 + k_{n+1}^T \Pi_n k_{n+1}}\right)\alpha_n + y_{n+1}\left(I - \frac{\Pi_n k_{n+1} k_{n+1}^T}{1 + k_{n+1}^T \Pi_n k_{n+1}}\right)\Pi_n k_{n+1},$$

$$K_{(n+1)m} = \begin{bmatrix} K_{nm} \\ k_{n+1}^T \end{bmatrix},$$

$$\Pi_n = (K_{mn}K_{nm} + \sigma_n^2 K_{mm})^{-1},$$

$$\Pi_{n+1} = (K_{m(n+1)}K_{(n+1)m} + \sigma_n^2 K_{mm})^{-1} = \Pi_n - \frac{\Pi_n k_{n+1} k_{n+1}^T \Pi_n}{1 + k_{n+1}^T \Pi_n k_{n+1}},$$

$$\alpha_n = [K_{mn}K_{nm} + \sigma_n^2 K_{mm}]^{-1} y.$$

With reference to the second aspect or any one of the foregoing possible implementation manners of the second aspect, in a fourteenth possible implementation manner of the second aspect, the data flow type detection module is further configured to update the threshold in real time according to a newly obtained historical data flow.

With reference to the second aspect or any one of the foregoing possible implementation manners of the second aspect, in a fifteenth possible implementation manner of the second aspect, the data flow type detection module is configured to establish a cumulative distribution function based on a data flow length sample of the historical data flow, and obtain the preset threshold according to the cumulative distribution function, where the historical data flow includes the at least one historical data flow corresponding to the at least one pattern similarity of the current data flow; and modify the cumulative distribution function and the preset threshold according to a data flow length sample of the newly obtained historical data flow.

In the present application, feature extraction is performed on a header of a first data packet of a data flow, and then a pattern similarity between a current data flow and a historical data flow in a database is calculated, and a length of a new data flow is predicted according to the pattern similarity and a length of the historical data flow. It is determined, by comparing the predicted length with a threshold, whether the new data flow is a large data flow. Compared with the prior art, traffic statistics do not need to be collected on the data flow directly, which not only can determine a type of the data in real time, but also can improve determining precision, and therefore a size of the data flow can be estimated once the first data packet is received, thereby providing a reliable basis on which path planning is implemented in real time.

BRIEF DESCRIPTION OF DRAWINGS

To describe the technical solutions in the embodiments of the present application more clearly, the following briefly introduces the accompanying drawings required for describing the embodiments of the present application. The accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. The described embodiments are merely some but not all of the embodiments of the present application. All other embodiments obtained by a person of ordinary skill in the art based on the embodiments of the present application without creative efforts shall fall within the protection scope of the present application.

Figure 1:
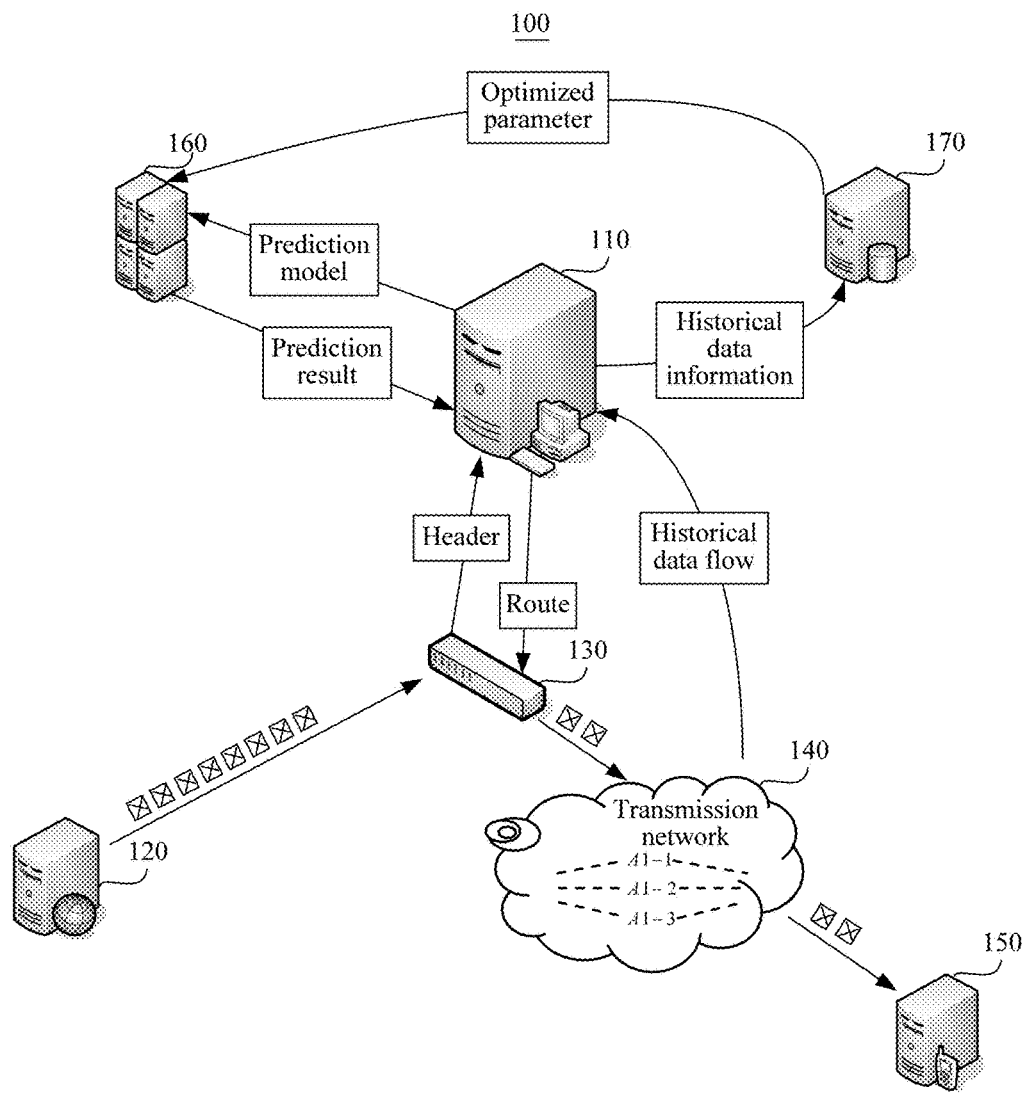
FIG. 1 is an architectural diagram of a data transmission network in which a method for determining a type of a network data flow is deployed according to an embodiment of the present application.

A method for determining a type of a network data flow according to the present application may be deployed and implemented in a data transmission network 100 shown in FIG. 1. The data transmission network 100 includes a central control server 110, a source server 120, a network switch 130, a transmission network 140, a client device 150, a prediction server 160, and a training server 170.

The central control server 110 is a core processing device of the transmission network 100, is separately connected to the network switch 130, the transmission network 140, the client device 150, the prediction server 160, and the training server 170, and is configured to perform information exchange, instruction transfer, and network data transmission with the network switch 130, the transmission network 140, the training server 170, and the prediction server 160. Moreover, the source server 120, the network switch 130, the transmission network 140, the client device 150, the training server 170, and the prediction server 160 may be connected to each other and perform information and instruction exchange according to different service requirements and function requirements. Functions and formations of the devices are described in detail below.

The central control server 110 mainly includes main components such as a processor, a memory, and a data interface, where the processor completes a corresponding processing function mainly by invoking a processing program stored in a storage device, and the data interface is mainly responsible for data receiving/transmitting between devices inside the central control server 110 and between the central control server 110 and an external component. The processor may be a general-purpose processor, a digital signal processor (DSP), an application specific integrated circuit (ASIC), a field programmable gate array (FPGA), or another programmable logical device, a discrete gate or transistor logical device, or a discrete hardware component, and may implement or perform methods, steps, and logical block diagrams disclosed in the following embodiments of the present application. The general-purpose processor may be a microprocessor, or the processor may be any regular processor. The steps in the methods disclosed with reference to the embodiments of the present application may be directly embodied to be implemented by means of execution of a hardware decoding processor, or implemented by means of execution of a combination of hardware in a decoding processor and a software module. The software module may be located in a storage medium that is mature in the art such as a random access memory (RAM), a flash memory, a read-only memory (ROM), a programmable read-only memory or an electrically erasable programmable memory, or a register.

The central control server 110 accepts, using the data interface, a routing request reported by the network switch 130, where the routing request includes information about a current data flow to be routed, and sends the information, about the current data flow, in the routing request to the prediction server 160 using the data interface. The prediction server 160 sends length prediction information of the current data flow to the central control server 110 according to the information about the current data flow, the central processing unit of the central control server 110 invokes the processing program pre-stored in the memory, determines a type of the current data flow according to the length prediction information, of the current data flow, returned by the prediction server 160, and calculates an optimal transmission path matching the type of the current data flow, and subsequently, the central control server 110 configures a route for the current data flow according to the optimal transmission path, and sends the configured route to the network switch 130. Moreover, the central control server 110 is further configured to collect, using the data interface of the central control server 110, information that is reported by the network switch 130 and that is about a historical data flow on which routing is already completed, and send the information about the historical data flow to the training server 170.

The source server 120 mainly includes main components such as a processor, a memory, and a data interface, where the processor is mainly configured to send, using the data interface and using the network switch 130 and the transmission network 140, data stored in the memory to the client device 150.

Main tasks of the network switch 130 are to extract a header of a first data packet of a data flow that newly enters the network, that is, a current data flow, report the header to the central control server 110, and wait and forward a data packet of the current data flow according to the route calculated and configured by the central control server 110. Moreover, the network switch 130 further collects the information about the historical data flow on which routing is already completed, and reports the information to the central control server 110. The information about the historical data flow includes a pattern vector and a corresponding data length of the historical data flow.

The transmission network 140 includes a transmission cable and multiple network nodes, and is mainly configured to transmit data according to an instruction of the network switch 130.

The client device 150 includes main components such as a processor, a memory, and a data interface, where the processor is mainly configured to send a data request of a client to the source server 120 using the data interface and the network switch 130, and store, in the memory, data content sent by the source server 120 and using the network switch 130 and the transmission network 140.

The prediction server 160 may be an independent processing device, and includes, for example, a processor, a memory, and a data interface that are independent, where the processor is mainly configured to invoke a processing program stored in the memory to process information that is about a current data flow and that is received using the data interface, so as to predict a length of the current data flow, and send the predicted length to the central control server 110 using length prediction information and using the data interface. The information about the current data flow comes from the central control server 110. Moreover, the prediction server 160 may be also a working unit attached to the central control server 110, that is, the prediction server 160 and the central control server 110 share a same memory and a same data interface, but use different processors, and in this case, data transmission between the prediction server 160 and the central control server 110 is mainly completed using a data bus inside the central control server 110. Moreover, the prediction server 160 may also share a same processor with the central control server 110, and a manner of the sharing may be to perform synchronous (parallel processing) or asynchronous (time-division processing) data processing using different processing resources in the processor, or to perform asynchronous (time-division processing) processing using a same processing resource in the processor. Moreover, the prediction server 160 may be also implemented using a virtual machine, that is, the central control server 110 simulates, using the processor, the memory, and the data interface of the central control server 110 and by invoking a program stored in the memory, a complete computer system that has a complete hardware system function and runs in a completely isolated environment, where the computer system may independently complete all work that the prediction server 160 needs to complete without affecting running of the central control server 110. It can be understood that, the prediction server 160 may be further simplified as a software program stored in the memory of the central control server 110, where the software program is invoked by the central control server 110 on a proper occasion, so as to implement the foregoing data length prediction function.

The training server 170 may be an independent processing device and includes main components such as a processor, a memory, and a data interface, where the processor is mainly configured to invoke a training program stored in the memory to process information about a historical data flow to obtain an optimized data length prediction parameter, and send the optimized data length prediction parameter to the prediction server 160, the prediction server 160 performs data length prediction according to the optimized data length prediction parameter, and moreover, the training server 170 further updates the data length prediction parameter according to newly obtained information about historical data, thereby ensuring that the prediction server 160 can adjust a prediction result in real time according to a change situation of a network data flow. The training server 170, similar to the prediction server 160, may be also a working unit attached to the central control server 110, that is, the training server 170 and the central control server 110 share a same memory and a same data interface, but use different processors, and in this case, data transmission between the training server 170 and the central control server 110 is mainly completed using the data bus inside the central control server 110. Moreover, the training server 170 may also share a same processor with the central control server 110, and a manner of the sharing may be to perform synchronous (parallel processing) or asynchronous (time-division processing) data processing using different processing resources of the processor, or to perform asynchronous (time-division processing) data processing using a same processing resource in the processor. Moreover, the training server 170 may be also implemented using a virtual machine, that is, the central control server 110 simulates, using the processor, the memory, and the data interface of the central control server 110 and by invoking a program stored in the memory, a complete computer system that has a complete hardware system function and runs in a completely isolated environment, where the computer system may independently complete all work that the training server 170 needs to complete. It can be understood that, the training server 170 may be further simplified as a software program stored in the memory of the central control server 110, where the software program is invoked by the central control server 110 on a proper occasion, so as to optimize the foregoing data length prediction parameter and update the foregoing data length prediction parameter in real time.

The foregoing is a hardware environment for implementing detection on a type of a network data flow according to the present application, but it should be noted that, the foregoing hardware environment is not a unique manner in which the present application is performed, and may be dynamically adjusted according to hardware resources, and service requirements, that is, data transmission requirements, for example, the central control server 110, the network switch 130, the prediction server 160, and the training server 170 are centralized in a data control center, so as to improve processing efficiency.

That is, the method of the present application may be deployed and implemented based on the foregoing application environment. A method for detecting a type of a network data flow according to the present application is described below with reference to the accompanying drawings.

Figure 2:
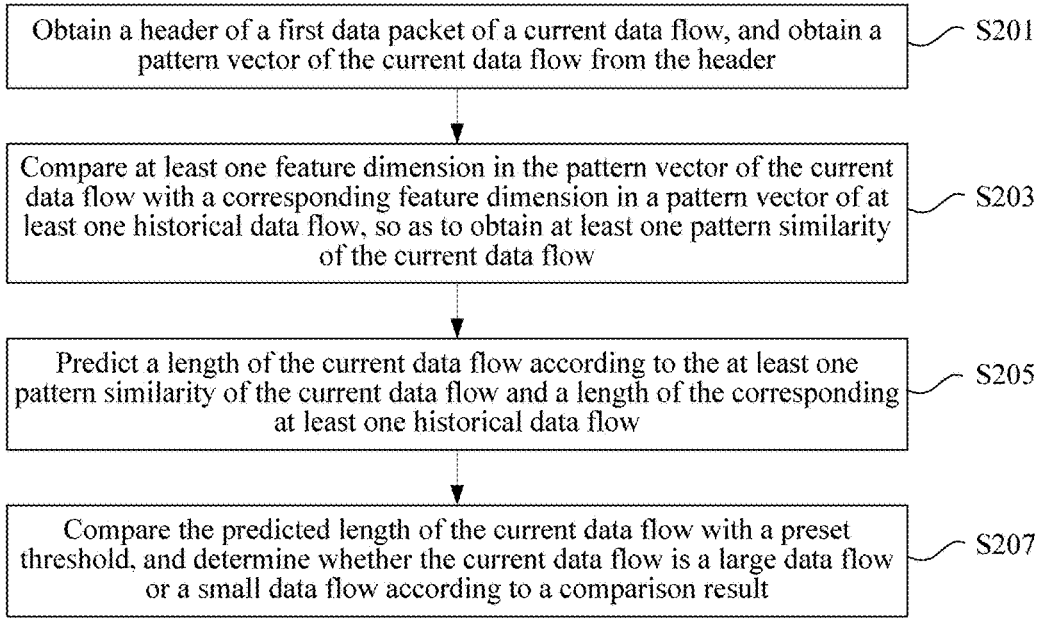
FIG. 2 is a schematic flowchart of a method for detecting a type of a network data flow according to an embodiment of the present application.

FIG. 2 is a schematic flowchart of a method for detecting a type of a network data flow according to an embodiment of the present application.

S201: Obtain a header of a first data packet of a current data flow of a network, and obtain a pattern vector of the current data flow from the header, where the pattern vector includes at least one feature dimension, and the at least one feature dimension is selected from an information combination including a source IP address, a server port, a destination IP address, and a client port of the current data flow, a transmission time of the current data flow, and a transport protocol used by the current data flow.

After a new data flow, that is, the current data flow, is detected, the header of the first data packet of the new data flow is obtained by a network switch 130, where a main objective of obtaining the header is to extract at least one piece of feature information that plays a key role in predicting a length of the data flow. The feature information that plays a key role in predicting the length of the data flow includes the source IP address, the server port, the destination IP address, and the client port of the current data flow, the transmission time (Start Time) of the current data flow, and the transport protocol used by the current data flow.

These pieces of feature information are extracted mainly because some specific user behavior patterns exist in a data center network. For example, a large data flow using a transport protocol may be sent from some source IP addresses to some destination IP addresses at fixed intervals using some ports. Correspondingly, feature information closely related to this type of specific behavior patterns may be used as an identifier of a type of a data flow, be used as a basic factor of determining the type of the current data flow individually, or in a free combination, that is, in a combination of any two, three or four pieces, or wholly, and be collected into a pattern vector. The pattern vector may be denoted as {src ip, src prt, dest ip, dest prt, prtcl, t}, where src ip is a source IP address of a data flow (a current data flow and a historical data flow), src prt is a server port of a data flow (a current data flow and a historical data flow), dest ip is a destination IP address of a data flow (a current data flow and a historical data flow), dest prt is a client port of a data flow (a current data flow and a historical data flow), prtcl is a protocol used by a data flow (a current data flow and a historical data flow), and t is a time at which a data flow (a current data flow and a historical data flow) is sent.

S203: Compare the at least one feature dimension in the pattern vector of the current data flow with a corresponding feature dimension in a pattern vector of at least one historical data flow, so as to obtain at least one pattern similarity of the current data flow, where the at least one pattern similarity of the current data flow and the pattern vector of the at least one historical data flow are in a one-to-one correspondence, and the pattern vector of the historical data flow is pre-stored in a database.

The step may be performed by a prediction server 160, the prediction server 160 compares the obtained pattern vector of the current data flow with a pattern vector of a historical data flow stored in the database, and the comparing is to compare a feature dimension in the pattern vector of the current data flow with a feature dimension in the pattern vector of the historical data flow, thereby obtaining a feature dimension similarity for each feature dimension on which comparison is performed, and obtaining/estimating at least one pattern similarity of the current data flow using the feature dimension similarity. The at least one pattern similarity of the current data flow denotes a similarity between the pattern vector of the current data flow and a pattern vector of one of the at least one historical data flow. The pattern vector of the historical data flow is pre-stored in the database, and the database storing the pattern vector of the historical data flow may be located in a network server, or may be located in a host performing the step, such as a memory of the prediction server 160.

Figure 3:
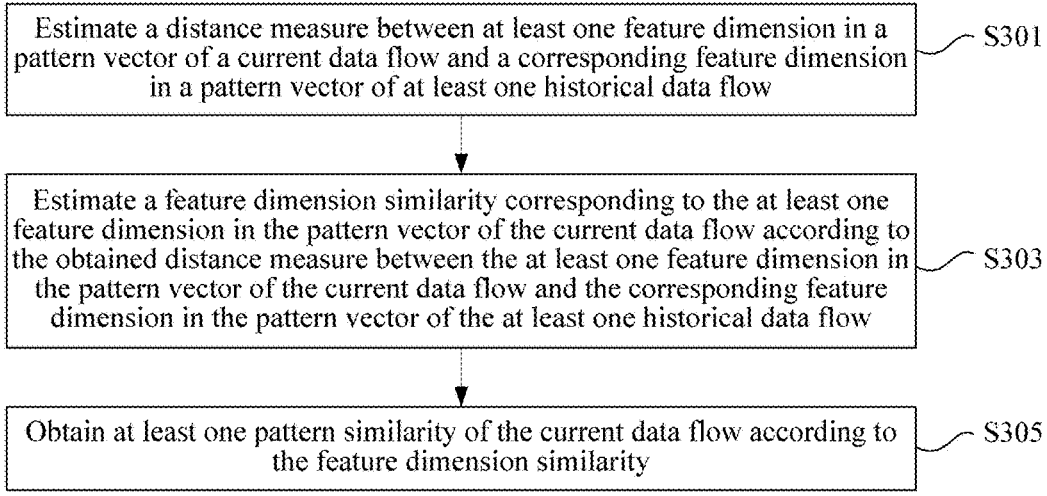
FIG. 3 is a schematic flowchart of a method for obtaining a pattern similarity in a method for detecting a type of a network data flow according to an embodiment of the present application.

The pattern similarity may be obtained in the following manner:

Reference may be made to FIG. 3, which shows a specific implementation manner of step S203 of the present application. However, it should be stated that, the following implementation manner is merely an implementation manner of implementing step S203, and a person skilled in the art may construct multiple different implementation manners based on enlightenment provided by S203, which should be also considered as a part of the present application.

S301: Estimate a distance measure between at least one feature dimension in a pattern vector of a current data flow and a corresponding feature dimension in a pattern vector of at least one historical data flow.

To objectively reflect a relationship, that is, a similarity, between the current data flow and the historical data flow, in the present application, quantitative analysis needs to be performed on the current data flow and the historical data flow in a specific manner in which the feature dimension in the pattern vector of the current data flow and the corresponding feature dimension in the pattern vector of the historical data flow are compared, and a comparison result is denoted using a distance measure, where the distance measure can be understood as a value, a quantized constraint relationship, or an equation used for expressing a similarity between compared objects. As described in step S201 of the present application, the pattern vector of the current data flow includes at least one feature dimension, and the at least one feature dimension is selected from a source IP address, a server port, a destination IP address, and a client port of the current data flow, a transmission time of the current data flow, and a transport protocol used by the current data flow. Correspondingly, the estimating a distance measure between at least one feature dimension in a pattern vector of a current data flow and a corresponding feature dimension in a pattern vector of at least one historical data flow is estimating a distance measure between a source IP address in the pattern vector of the current data flow and a source IP address in the pattern vector of the historical data flow, or/and estimating a distance measure between a server port in the pattern vector of the current data flow and a server port in the pattern vector of the historical data flow, or/and estimating a distance measure between a destination IP address in the pattern vector of the current data flow and a destination IP address in the pattern vector of the historical data flow, or/and estimating a distance measure between a client port in the pattern vector of the current data flow and a client port in the pattern vector of the historical data flow, or/and estimating a distance measure between a transmission time, of the current data flow, in the pattern vector of the current data flow and a transmission time, of the historical data flow, in the pattern vector of the historical data flow, or/and estimating a distance measure between a transport protocol, used by the current data flow, in the pattern vector of the current data flow and a transport protocol, used by the historical data, in the pattern vector of the historical data flow.

Correspondingly, the distance measure between the at least one feature dimension in the pattern vector of the current data flow and the corresponding feature dimension in the pattern vector of the historical data flow includes: an IP address distance measure, a port distance measure, a transmission time distance measure, and a transport protocol distance measure. Moreover, according to the foregoing definition, "the distance measure can be understood as a value, a constraint relationship, or an equation used for expressing a similarity between compared objects", it can be understood that, each feature dimension may be used for measuring a similarity between the current data flow and the historical data flow in an aspect, and therefore, the foregoing feature dimensions may be combined freely according to requirements in different scenarios, so as to obtain an optimal pattern similarity. For example, an IP address pair (a source IP address and a destination IP address) may be combined with the transport protocol used by the current data flow to obtain a pattern similarity, or a destination IP address pair, a port pair (a server port and a client port), and the transport protocol used by the current data flow are combined to obtain a pattern similarity.

How to obtain the IP address distance measure, the port distance measure, the transmission time distance measure, and the transport protocol distance measure is described below.

IP Address Distance Measure

An IP address represents a physical address or logical address of the foregoing source server 120 or client device 150. In a data center network, IP addresses belong to a same subdomain, that is, the source server 120 or the client device 150 of a subnetwork (Subnetwork) of the network may have a same or similar network data transmission pattern, and lengths of these data flows sent by the source server 120 or the client device 150 having the similar network transmission pattern may be relatively similar, that is, a probability that the lengths are similar is relatively large. Therefore, a similarity between IP addresses (a source address and a destination address) of the current data flow and IP addresses of the historical data flow may be used as a feature dimension similarity measure, that is, an IP address distance measure, to perform data flow length prediction.

Generally, an IP address is a 32-bit binary character string, and $LPL(x_{1,ip}, x_{2,ip})$ is defined as a longest prefix length (Longest Prefix Length) of two IP addresses.

For example, in an example given below, $x_{1,ip}$:1100 0010, 1010 0110, 0000 0000, 0000 0000

$x_{2,ip}$:1100 0010, 1010 1010, 0000 0000, 0000 0001 where $X_{1,ip}$ and $X_{2,ip}$ represent a source IP address or destination IP address of a current data flow, and a source IP address or destination IP address of a historical data flow respectively, and a longest matching prefix of $X_{1,ip}$ and $X_{2,ip}$ is 11000010,1010, and therefore a longest prefix length of these two IP addresses is $LPL(x_{1,ip}, x_{2,ip})=12$ It should be noted that, $x_{1,ip}$ and $x_{2,ip}$ are not limited to representing the source IP address or destination IP address of the current data flow, and the source IP address or destination IP address of the historical data flow, and may represent IP addresses of any two data flows.

A distance measure of two IP addresses is defined as:

$$d_{ip}(x_{1,ip}, x_{2,ip}) = \log \frac{33}{LPL(x_{1,ip}, x_{2,ip}) + 1}$$

The foregoing distance measure satisfies the following four properties:

non-negativity: $d_{ip}(x_{1,ip}, x_{2,ip}) \geq 0$ indistinguishable identity: $d_{ip}(x_{1,ip}, x_{2,ip}) = 0$ iff $x_{1,ip} = x_{2,ip}$ symmetry: $d_{ip}(x_{1,ip}, x_{2,ip}) = d_{ip}(x_{2,ip}, x_{1,ip})$ triangular inequality: $d_{ip}(x_{1,ip}, x_{3,ip}) \leq d_{ip}(x_{1,ip}, x_{2,ip}) + d_{ip}(x_{2,ip}, x_{3,ip})$ Port Distance Measure Lengths of data flows sent by different application programs generally have different features, and different application programs may send data using port numbers in different ranges. Therefore, a transmission port of a data flow may be generally configured to estimate a length of a data flow.

A network port is generally a 16-bit binary character string, whose value ranges from 0 to 65535. In the present application, the port distance measure is described using a port segmentation method frequently used in the art, but it should be noted that, the present application is not limited to this port segmentation method. According to indication of an article named "On measuring the Similarity of Network Hosts: Pitfalls, New Metrics, and Empirical Analyses" and published by Scott E. Coull, Fabian Monrose and others, port addresses are generally divided into the following different groups according to an IANA port list:

well-known port (well-known): 0 to 1023
registered port (registered): 1024 to 49151
dynamic port (dynamic): 49152 to 65535

According to the article of Scott E. Coull, Fabian Monrose and others, compared with the dynamic port (dynamic), the well-known port (well-known) and the registered port (registered) are closer, because statistically, they are generally configured to send data of some specific services.

In the present application, the port distance measure is implemented using the method proposed by Scott E. Coull, Fabian Monrose, and others However, it should be noted that, the method is merely an implementation manner of implementing the port distance measure, and the port distance measure may be implemented using another implementation manner in the present application, for example, because a network port is a 16-bit character string, a distance between two network ports may be also calculated using a method for an IP address distance measure.

According to the method proposed by Scott E. Coull, Fabian Monrose and others, the port distance measure is obtained using the following formula:

$$d_{prt}(x_{1,port}, x_{2,port}) = \begin{cases} 0 & \text{if } x_{1,port} = x_{2,port} \\ 1 & \text{if } \delta_{port}(x_{1,port}) = \delta_{port}(x_{2,port}) \\ 2 & \text{if } \delta_{port}(x_{1,port}) \in \{0, 1\} \& \delta_{port}(x_{2,port}) \in \{0, 1\} \\ 4 & \text{if } \delta_{port}(x_{1,port}) \in \{0, 1\} \& \delta_{port}(x_{2,port}) = 2 \mid \delta_{port}(x_{1,port}) = 2 \& \delta_{port}(x_{2,port}) \in \{0, 1\} \end{cases}$$

where $x_{1,port}$ and $x_{2,port}$ represent a server port or client port of a current data flow, that is, a port of the source server 120 or a port of the client device 150, and a server port or client port of a historical data flow respectively. It should be noted that, $x_{1,port}$ and $x_{2,port}$ are not limited to representing the server port or client port of the current data flow, and the server port or client port of the data flow, and may represent server ports or client ports of any two data flows.

A value of a parameter $\delta_{port}(x)$ is obtained using the following formula:

$$\delta_{port}(x) = \begin{cases} 0 & \text{if } x \in [0, 1023] \\ 1 & \text{if } x \in [1024, 49151] \\ 2 & \text{if } x \in [49152, 65535] \end{cases}$$

where $\delta_{port}(x)$ is a value assigned to a range type to which the server port or the client port belongs, and x is a value of the server port or the client port.

Transmission Time Distance Measure

A time pattern may exist when a user sends data to a network, or a server sends data to a user using a network, for example, most of large data may be sent in a centralized manner in some periods of time, and the user or the server may consider that in some periods of time, network data transmission is relatively less, and a data transmission link bandwidth that may be used is relatively larger; or a periodic pattern on a transmission time of a large data flow (an elephant flow) exists for the user or the server. Therefore, a transmission time of a data flow, that is, a transmission time distance measure of the data flow may be used for estimating the size of the data flow.

The transmission time is a simple integer variable, and therefore the transmission time distance measure may be simply defined as an absolute value of a difference between two transmission times.

$$d_t(x_{1,t}, x_{2,t}) = |x_{1,t} - x_{2,t}|$$

where $d_t$ is a transmission time distance measure, and $x_{1,t}$ and $x_{2,t}$ are a transmission time of a current data flow and a transmission time of a historical data flow respectively.

Transport Protocol Distance Measure

A transport protocol used by a data flow may be generally also used for estimating a length of the data flow, for example, a large data flow (an elephant flow) is generally transmitted using a transmission control protocol (TCP) protocol, and some small data flows are generally transmitted using a user datagram protocol (UDP) protocol. It is assumed that, in entire network data flows, there are totally N different transport protocols, such as Prtcl={$p_1, p_2, \ldots p_N$}. A protocol used by a data flow is denoted using a 0-1 vector of N dimensions. When the data flow uses an $i^{th}$ transport protocol, the $i^{th}$ dimension of the vector is 1, and other dimensions are all 0. For example, in the following example, if a data flow uses a second transport protocol, a vector of a protocol used by the data flow is denoted as:

$$x_{1,prtcl} = \begin{bmatrix} 0 \\ 1 \\ \vdots \\ 0 \end{bmatrix}$$

Correspondingly, a protocol distance measure may be defined as:

$$d_{prtcl}(x_{1,prtcl}, x_{2,prtcl}) = \|x_{1,prtcl} - x_{1,prtcl}\|_2$$

where $x_{1,prtcl}$ is a vector of a transport protocol used by a current data flow, $x_{2,prtcl}$ is a vector of a protocol used by a historical data flow, $d_{prtcl}(x_{1,prtcl}, x_{2,prtcl})$ is the transport protocol distance measure, and $\|x_{1,prtcl} - x_{1,prtcl}\|_2$ is a two-norm of a difference between the vectors of the two transport protocols.

A protocol used by a data flow is denoted using 0-1, and therefore, a value of the foregoing protocol distance measure can be only 0 or $\sqrt{2}$.

Once the foregoing distance measures of different dimensions are obtained, a similarity, that is, feature dimension similarity, between features of different dimensions may be calculated according to the obtained distance measures.

After distance measures between multiple feature dimensions of the current data flow and corresponding multiple feature dimensions of the historical data flow are obtained in step S301, the distance measures may be used for calculating a feature dimension similarity corresponding to the multiple feature dimensions of the current data flow, that is, after step S301, the method further includes the following step:

S303: Estimate a feature dimension similarity corresponding to the at least one feature dimension in the pattern vector of the current data flow according to the obtained distance measure between the at least one feature dimension in the pattern vector of the current data flow and the corresponding feature dimension in the pattern vector of the at least one historical data flow.

Figure 4:
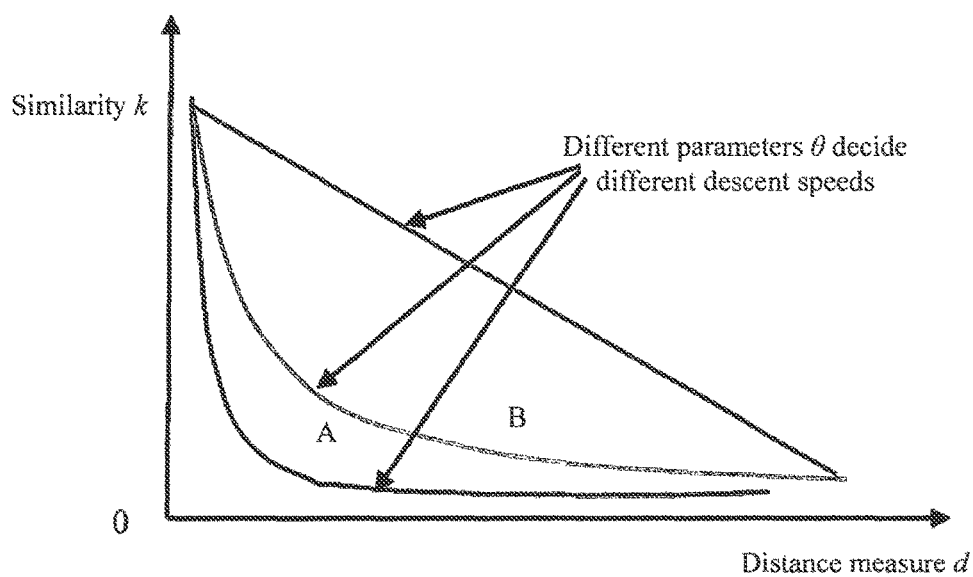
FIG. 4 is a curve graph of a function for estimating a feature dimension similarity in a method for detecting a type of a network data flow according to an embodiment of the present application.

Referring to FIG. 4, a basic rule of estimating a feature dimension similarity based on a distance measure between feature dimensions is: a smaller distance measure between feature dimensions indicates a higher feature dimension similarity, and on the contrary, a larger distance measure between feature dimensions indicates a lower feature dimension similarity. Therefore, an index decrease function shown in FIG. 4 may be used as a function for calculating the feature dimension similarity. In FIG. 4, a horizontal coordinate denotes a distance measure between feature dimensions, a vertical coordinate denotes a feature dimension similarity, and a curve/straight line in FIG. 4 reflects a relationship between a distance measure between feature dimensions and a feature dimension similarity, where a parameter θ of a curve/straight line represents a speed at which a feature dimension similarity decreases as a distance measure increases. Different curves/straight lines in FIG. 4 represent relationships between different distance measures between feature dimensions and feature dimension similarities, for example, a curve A represents a relationship between an IP address distance measure and an IP address similarity corresponding to the IP address distance measure, and a curve B represents a relationship between a port distance measure and a port similarity corresponding to the port distance measure.

A corresponding feature dimension similarity based on a distance measure between feature dimensions may be defined using the following function:

$$k_f(x_{1,f}, x_{2,f}, \theta_f) = \exp\left[-\frac{d_f(x_{1,f}, x_{2,f})}{\theta_f}\right],$$

where $k_f$ is a feature dimension similarity, $d_f$ is a feature dimension measure, $\theta_f$ represents a parameter of a similarity function of one of the at least one feature dimension, and a value of the parameter controls a speed at which the similarity function decreases as a distance measure increases, and also controls a weight that the feature dimension accounts for in data flow length prediction, and f denotes a feature dimension, that is, $$f \in \underbrace{\{src\_ip, src\_prt, dest\_ip, dest\_prt, prtcl, t\}}_{F}$$

where src ip is a source IP address of a data flow (a current data flow and a historical data flow), src prt is a server port of a data flow (a current data flow and a historical data flow), dest ip is a destination IP address of a data flow (a current data flow and a historical data flow), dest prt is a client port of a data flow (a current data flow and a historical data flow), prtcl is a protocol used by a data flow (a current data flow and a historical data flow), t is a time at which a data flow (a current data flow and a historical data flow) is sent, F is dimensions that are corresponding to feature dimensions in a pattern vector of a current data flow and that are corresponding to a pattern vector of a historical data flow, that is, separately corresponding to a source IP address, a server port, a destination IP address, a client port, a transport protocol used by a data flow, and a transmission time of a data flow.

The following may be obtained using the foregoing function:

An IP address similarity function is:

$$k_{ip}(x_{1,ip}, x_{2,ip}) = \exp\left(-\frac{d_{ip}(x_{1,ip}, x_{2,ip})}{\theta_{ip}}\right)$$

where $x_{1,ip}, x_{2,ip}$ are two source IP addresses or two destination IP addresses, $d_{ip}(x_{1,ip}, x_{2,ip})$ is a distance measure between two IP addresses, and $\theta_{ip}$ is a parameter for controlling a speed at which the IP address similarity function decreases along with an IP address distance measure.

A port similarity function is:

$$k_{port}(x_{1,port}, x_{2,port}) = \exp\left(-\frac{d_{port}(x_{1,port}, x_{2,port})}{\theta_{port}}\right)$$

where $x_{1,port}, x_{2,port}$ are two server ports or two client ports, $d_{port}(x_{1,port}, x_{2,port})$ is a distance measure between two ports, and $\theta_{port}$ is a parameter for controlling a speed at which the port similarity function decreases along with a port distance measure.

A protocol similarity function is:

$$k_{prtcl}(x_{1,prtcl}, x_{2,prtcl}) = \exp\left(-\frac{d_{prtcl}(x_{1,prtcl}, x_{2,prtcl})}{\theta_{prtcl}}\right)$$

where $x_{1,prtcl}, x_{2,prtcl}$ are protocols used by two data flows, $d_{prtcl}(x_{1,prtcl}, x_{2,prtcl})$ is a distance measure between two protocols, and $\theta_{prtcl}$ is a parameter for controlling a speed at which the protocol similarity function decreases along with a protocol distance measure.

Moreover, a periodic large data flow transmission pattern may exist for the user, and is a very important behavior pattern, and this behavior pattern needs to be actively identified and captured, and therefore an accuracy of estimating a feature dimension similarity can be improved for the behavior pattern. Therefore, for this dimension of time, the foregoing similarity definition may be replaced with the following similarity definition, and the definition is characterized by automatically capturing a transmission period (if exists).

$$k_t(x_{1,t}, x_{2,t}, \theta_{at}, \theta_{pt}, \varpi_t) = \exp\left[-\frac{d_t(x_{1,t}, x_{2,t})}{\theta_{at}}\right]\exp\left\{-\frac{\sin^2[\varpi_t d_t(x_{1,t}, x_{2,t})]}{\theta_{pt}}\right\}$$

where $k_t$ is a transmission time similarity between data flows (a current data flow and a historical data flow), $d_t$ is a transmission time distance measure of a data flow, and $\theta_{at}$ and $\theta_{pt}$ represent non-periodic and periodic weights in a transmission behavior pattern. Sizes of $\theta_{at}$ and $\theta_{pt}$ relative to each other depend on which one of aperiodicity and periodicity in a user transmission pattern is more obvious, and $\varpi_t$ represents a period in which a user sends a data flow.

Different feature dimension similarities may be obtained in the foregoing manner of estimating a feature dimension similarity.

Therefore, after step S303 described above, the method for estimating a feature dimension similarity may further include the following step:

S305: Obtain at least one pattern similarity of the current data flow according to the feature dimension similarity.

In the step, the foregoing feature dimension similarity may be used independently or in combination as a subsequent factor for estimating the length of the current data flow, and if the feature dimension similarity is individually used, according to a weight corresponding to the at least one feature dimension in the pattern vector of the current data flow, a feature dimension similarity corresponding to a feature dimension whose weight is highest of the feature dimension is used as a pattern similarity of the current data flow; or if the feature dimension similarity is used in combination, weighted combination is performed on two and more than two feature dimension similarities according to a weight corresponding to the at least one feature dimension in the pattern vector of the current data flow, and a combined feature dimension similarity is used as a pattern similarity of the current data flow, where the weight corresponding to the at least one feature dimension in the pattern vector of the current data flow refers to a measure of impact of different feature dimensions on a determining accuracy in detection on the type of the current data flow. For different application scenarios, weights of feature dimensions of different features are also different, a weight corresponding to each feature dimension may be obtained by analyzing a model obtained by means of training, or may be obtained using expert knowledge. To comprehensively consider each feature dimension affecting the length of the current data flow, on the premise that all of the foregoing feature dimension similarities are obtained by means of estimation, in the present application, the foregoing multiple feature dimension similarities are integrated in a combination manner to obtain the pattern similarity of the current data flow, so as to further improve similarity estimation precision, thereby improving precision of estimating the length of the current data flow.

Each feature dimension in a pattern vector of a data flow affects estimation on a length of the data flow, but weights that features of different dimensions account for when the length of the data flow is predicted differ from each other. Moreover, value ranges of pattern similarities of different dimensions are also different, and therefore, a problem about how to integrate information about different feature dimensions, and automatically weigh importance of the different feature dimensions needs to be resolved. In the present application, information about different dimensions is integrated using the following similarity function, and moreover, an objective of automatically weighing weights of different feature dimensions can be further achieved.

$$K(x_1, x_2, \theta_m) = \theta_m \prod_{f \in F} k_f(x_{1,f}, x_{2,f}, \theta_f)$$

where $K(x_1, x_2, \theta_m)$ is a integrated pattern similarity, that is, a pattern similarity of a current data flow, $\theta_m$ is an amplitude parameter of a pattern similarity function, $\theta_m \in \Theta$, and $\Theta = [\theta_{src\_ip} \; \theta_{src\_prt} \cdots \theta_{at} \; \theta_{pt} \; \overline{\omega}_t]$. A parameter in $\Theta$ may be obtained by means of model training, and, obtained by maximizing a likelihood of data of a historical data flow or minimizing a prediction error of a historical data flow. Therefore, a parameter vector $\Theta$ represents a data transmission behavior pattern of an entire network, and has an adaptivity.

In the present application, once the pattern similarity of the current data flow is obtained, the length of the current data flow may be predicted using the pattern similarity, that is, after step S203, the method of the present application further includes the following step:

S205: Predict a length of the current data flow according to the at least one pattern similarity of the current data flow and a length of the corresponding at least one historical data flow, where the length of the at least one historical data flow is pre-stored in the database, and the length of the at least one historical data flow and the pattern vector of the at least one historical data flow are in a one-to-one correspondence.

The length of the current data flow is predicted using the obtained at least one pattern similarity of the current data flow and the length of the at least one historical data flow corresponding to the current data flow, and a basic principle of the prediction is: weighted combination is performed on the length of the historical data flow corresponding to the at least one pattern similarity according to the at least one pattern similarity of the current data flow to predict the length of the current data flow, where a weight of the length of the historical data flow when the weighted combination is performed depends on a similarity between the pattern vector of the current data prediction data flow and pattern vectors of multiple historical data flows, that is, depends on at least one pattern similarity of the current data flow. It should be noted that, if the current data flow has only one pattern similarity, the length of the corresponding historical data flow is also only one, and correspondingly, the weight is 1, and only weighting needs to be implemented but combination does not need to be implemented for the foregoing weighted combination, that is, in this case, the length of the historical data flow may be directly a predicted value of the length of the current data flow.

Figure 5:
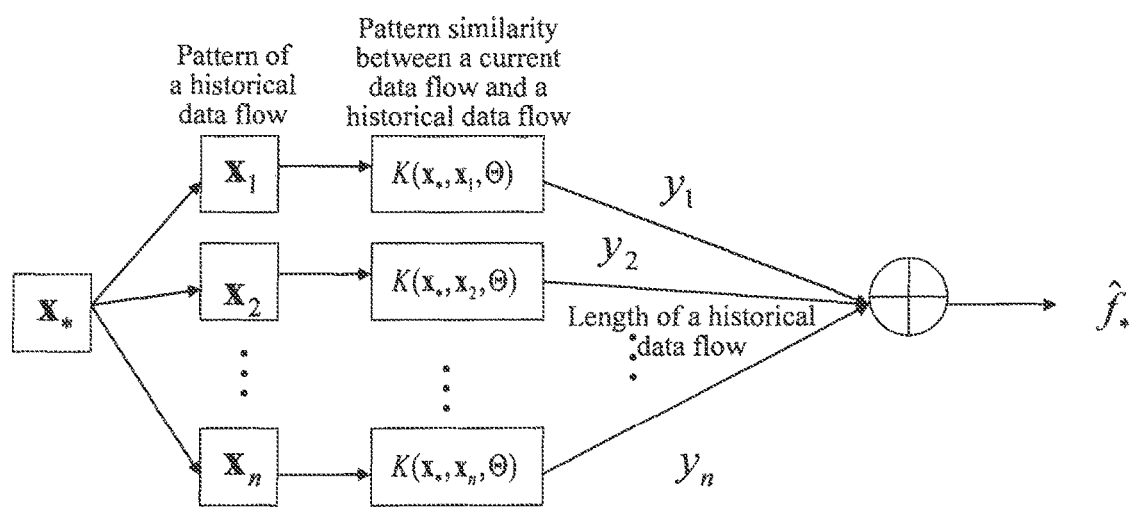
FIG. 5 is a schematic flowchart of a logical process of data flow length prediction in a method for detecting a type of a network data flow according to an embodiment of the present application.

Referring to FIG. 5, the figure denotes a basic logical process of data flow length prediction, where $X_*$ is a pattern vector of a header of a first data packet of a to-be-predicted current data flow, and $X_1$ to $X_n$ are pattern vectors of historical data flows. $K(X_*,X_1,\Theta)$ to $K(X_*,X_n,\Theta)$ are pattern similarities between the pattern vector of the current data flow and the pattern vectors of the historical data flows, that is, pattern similarities of the current data flow, $y_1 \sim y_n$ are lengths of the historical data flows, and $\hat{f}_*$ is a predicted length of the current data flow, and is obtained using the following formula:

$$\hat{f}_* = \sum_{i=1}^{n} w_i y_i$$

where $w_i$ is a weight factor, whose size depends on a similarity between the pattern vector of the current data flow and a pattern vector of the $i^{th}$ historical data flow, that is, whose size depends on the $i^{th}$ pattern similarity of at least one pattern similarity of the current data flow, the $i^{th}$ pattern similarity is a pattern similarity between the pattern vector of the current data flow and a pattern vector of the $i^{th}$ historical data flow of the at least one historical data flow, and $y_i$ is a length of the $i^{th}$ historical data flow of the at least one historical data flow and may be obtained using the following function:

$$w_i = g(K(x_*,x_i,\Theta))$$

The function g is implemented in multiple different manners. Different implementation manners represent different models and different model explanations. Generally, the function may be implemented using Gaussian process regression (Gaussian Process Regression) or a Nadaraya-Watson estimator (Nadaraya-Watson Estimator). How to predict a length of current data using the function g is described below using Gaussian process regression (Gaussian Process Regression), that is, the length of the current data flow is predicted using the prediction model g. It should be noted that the present application is not limited to the prediction model based on Gaussian process regression, and the present application may be further implemented using another prediction model.

The length $\hat{f}_*$ of the current data flow and the lengths $y_1 \sim y_n$ of the historical data flows that are normalized are considered as random variables, and these variables comply with the following joint Gaussian distribution:

$$\begin{bmatrix} f_* \\ y \end{bmatrix} \sim N\left(0, \underbrace{\begin{bmatrix} K(X,X)+\sigma_n^2 I & K(X,x_*) \\ K(x_*,X) & K(x_*,x_*) \end{bmatrix}}_{C}\right)$$

Herein, $K(X,X)$ denotes a pattern similarity matrix of the historical data flows; $K(x_*,X)$ denotes a pattern similarity between the to-be-predicted current data flow and a historical data flow; and herein, they determine a covariance matrix (covariance matrix) of joint Gaussian distribution.

$X=[x_1 \ldots x_n]$ is a pattern vector of the historical data flow; $y=[y_1 \ldots y_n]^T$ is a length of the historical data flow, $X_*$ is a pattern vector of the current data flow, $\hat{f}_*$ is the length of the to-be-predicted current data flow, and C is a covariance matrix of joint Gaussian distribution, and is obtained using a similarity between the pattern vector of the current data flow and the pattern vector of the historical data flow.

A condition probability distribution function about the length of the to-be-predicted current data flow may be obtained according to the joint Gaussian distribution function described above:

$$f_*|X,y,x_* \sim N(\bar{f}_*,cov(f_*))$$

where an average value of condition probability distribution is:

$$\bar{f}_* = K(x_*,X)[K(X,X)+\sigma_n^2 I]^{-1} y$$

a variance of condition probability distribution is:

$$cov(f_*) = K(x_*,x_*) - K(x_*,X)[K(X,X)+\sigma_n^2 I]^{-1} K(X,x_*)$$

Generally, the average value of condition probability distribution may be used as a predicted value of a length of a new data flow, that is, $$\hat{f}_* = \bar{f}_* = K(x_*,X)[K(X,X)+\sigma_n^2 I]^{-1} y = w^T y;$$

where $x_*$ is a pattern vector of a to-be-predicted current data flow; X is a pattern vector of a historical data flow; therefore $K(x_*,X)$ denotes a pattern similarity between the to-be-predicted current data flow and a selected historical data flow. An element of the $i^{th}$ row and the $j^{th}$ column of a pattern similarity matrix K of the historical data flow denotes a pattern similarity between the $i^{th}$ historical data flow and the $j^{th}$ historical data flow. y is a data flow length of the historical data flow. $K_{mm}, K_{nm}, K_{mn}$ are submodules of the matrix K that are shown as follows:

$$K = \begin{bmatrix} K_{mm} & K_{m(n-m)} \\ K_{(n-m)m} & K_{(n-m)(n-m)} \end{bmatrix}, K_{mn} = \lfloor K_{mm} \ K_{m(n-m)} \rfloor, \text{ and}$$

$$K_{nm} = \begin{bmatrix} K_{mm} \\ K_{(n-m)m} \end{bmatrix}$$

A Gaussian process regression model is an implementation manner of predicting the length of the current data flow in the present application, the length of the to-be-predicted current data flow may be obtained using a weighted combination of lengths of historical data flows, and a weight of a length of each historical data flow is decided by a similarity between the pattern vector of the current data flow and the pattern vector of the historical data flow.

$$\hat{f}_* = \bar{f}_* = K(x_*,X)[K(X,X)+\sigma_n^2 I]^{-1} y = w^T y$$

It can be seen from the foregoing formula that, a predicted value of a data flow length of the to-be-predicted current data flow is obtained by performing weighted combination on data flow lengths of historical data flows, and a weight vector $w^T$ is determined according to a similarity between a pattern vector of the current data flow and a pattern vector of a historical data flow, which is shown as follows:

$$w^T = K(x_*, X)[K(X,X) + \sigma_n^2 I]^{-1}$$

Besides, a confidence interval of 3σ of a predicted value may be further obtained, where the confidence interval of 3σ refers to a confidence interval of 99.73% in Gaussian distribution, that is, a probability that the data flow length of the to-be-predicted current data flow falls within this interval is 99.73%, which is shown as follows:

$$[\bar{f}_* - 3\text{cov}(f_*), \bar{f}_* + 3\text{cov}(f_*)]$$

A main objective of setting the confidence interval is to improve high accuracy and high robustness of predicting the length of the current data flow. Moreover, this interval may provide some confidence levels for the predicted value, for example, when the confidence interval is relatively narrow, the predicted value is predicted more accurately, because this means that a fluctuation range of the predicted value is relatively small. When multiple to-be-predicted data flows need to be predicted and routed, the data flows may be sequenced according to information provided by this confidence interval, and a data flow whose confidence interval is small is preferably selected and routed, because fluctuation of a predicted data flow length of the data flow is small. A main parameter of the foregoing prediction model based on Gaussian process regression comes from a pattern similarity between a current data flow and a historical data flow. As described above, pattern similarities are generally obtained from different feature dimension similarities, and roles played by different feature dimension similarities are not the same in the process of predicting the length of the current data flow, some feature dimension similarities play relatively unimportant roles, and some feature dimension similarities play relatively important roles, and therefore, to obtain an optimal prediction model, such as a prediction model based on Gaussian process regression, it is proposed in the present application that a prediction model is trained using a sample of a historical data flow, a parameter of the model is optimized, and the optimized parameter is used for predicting the length of the current data flow.

Generally, a model may be trained and a model parameter may be optimized using maximum likelihood estimation or minimizing a model prediction error. For example, if the function g is implemented using the Gaussian process regression model (Gaussian Process Regression), the parameter of the model may be optimized by maximizing the likelihood of historical data, and a specific process is as follows:

According to the prediction model based on Gaussian process regression, a likelihood function of a training sample may be obtained, which is shown as follows:

$$\log p(y|X,\Theta) = -\tfrac{1}{2} y^T [K + \sigma_n^2 I]^{-1} y - \tfrac{1}{2} \log |K + \sigma_n^2 I| - n/2 \log 2\pi$$

Herein, K is a pattern similarity matrix of historical data flows, and an element of the $i^{th}$ row and the $j^{th}$ column of the pattern similarity matrix denotes a pattern similarity between a historical data flow i and a historical data flow j. I is a unit matrix that has a same dimension as that of K. $\sigma_n^2$ is a prediction model noise variance. y is a length of a historical data flow.

Then, a model parameter may be optimized by maximizing the likelihood of the training sample. For example, a parameter iteration formula may be constructed in a steepest gradient descent manner, which is shown as follows:

$$\Theta \leftarrow \Theta + \eta \frac{\partial \log p(y|X,\Theta)}{\partial \Theta}$$

where $$\frac{\partial}{\partial \theta_j} \log p(y|X,\theta) = \tfrac{1}{2} y^T K^{-1} \frac{\partial K}{\partial \theta_j} K^{-1} y - \tfrac{1}{2} tr\left(K^{-1} \frac{\partial K}{\partial \theta_j}\right), \text{ and}$$

$$= \tfrac{1}{2} tr\left((\alpha\alpha^T - K^{-1}) \frac{\partial K}{\partial \theta_j}\right)$$

$$\alpha = K^{-1} y.$$

Moreover, in an entire network running process, data flows continuously reach a destination. When a data flow reaches the destination, a true data flow length of this data flow may be known in a manner, for example, may be obtained by reading a counter state of an openflow switch or obtained using an sflow technology. In this case, a combination of a pattern vector and the true data flow length of this data flow is obtained. This combination becomes a new training sample of the model.

To enable the model to better adapt to dynamic changes of the entire network, the prediction model for the data flow length may be continuously updated using the new training sample, so that the length of the current data flow can be predicted more accurately using the prediction model.

The prediction model for the data flow length may be updated in the following manner:

It is assumed that at a moment t, information $(X_n, y_n)$ about n historical data flows is collected and calculated, where $X_n$ is a pattern vector of a historical data flow, and $y_n$ is a length of the historical data flow. An optimal parameter of the prediction model may be obtained according to the following formula:

$$\Theta_n^{opt} = \arg\max_\Theta \log p(y_n | X_n, \Theta)$$

When the $(n+1)^{th}$ training sample, that is, a historical data flow, arrives at a moment t+1, information about the new historical data flow is brought into the prediction model, and then a parameter of the prediction model needs to be modified.

$$X_{n+1} = [X_n\ x_{n+1}] y_{n+1}^T = \lfloor y_n^T\ y_{n+1} \rfloor$$

$$\Theta_{n+1}^{opt} = \arg\max_\Theta \log p(y_{n+1} | X_{n+1}, \Theta)$$

When $\log p(y_{n+1}|X_{n+1},\Theta)$ is calculated, a matrix $K_{n+1}$ needs to be inverted, and calculation complexity thereof is $O((n+1)^3)$, where $$K_{n+1} = \begin{bmatrix} K_n & K(X_n, x_{n+1}) \\ K(x_{n+1}, X_n) & k(x_{n+1}, x_{n+1}) \end{bmatrix}$$

is a pattern similarity matrix of n+1 historical data flows.

New training samples are continuously generated, and a quantity of the new training samples is huge, and therefore if the foregoing operation is performed each time a new training sample arrives, time complexity thereof is very huge. Therefore it is necessary to propose a solution that is efficient, online, and low in calculation complexity to implement real-time online update on the prediction model. Therefore, the present application provides a solution based on a Gaussian process model of reduced rank approximation (Reduced Rank Approximation) in combination with a Woodbury matrix inversion identity (Woodbury matrix inversion identity), to implement an online update solution for a model based on a new training sample, and a main implementation manner of the method is: an entire historical data flow set is approximated using some subsets of the historical data flow set, which is implemented in the following formula:

$$\hat{f}_* = K(x_*, X_m)[K_{mn}K_{nm} + \sigma_n^2 K_{mm}]^{-1} K_{mn} y$$

where $x_*$ is a pattern vector of a to-be-predicted current data flow; $X_m$ is a pattern vector of a subset of historical data flows, where the subset includes m historical data flows and may be randomly selected from the historical data flows; and $K(x_*, X_m)$ denotes a pattern similarity between the to-be-predicted current data flow and the selected historical data flow subset. $K_{mn}$, $K_{mm}$, and $K_{nm}$ are submodules of a pattern similarity matrix K of the historical data flows, an element of the $i^{th}$ row and the $j^{th}$ column of the pattern similarity matrix K of the historical data flows denotes a pattern similarity between a historical data flow i and a historical data flow j, y is a flow length of a historical data flow, $$K = \begin{bmatrix} K_{mn} & K_{m(n-m)} \\ K_{(n-m)m} & K_{(n-m)(n-m)} \end{bmatrix}, K_{mn} = \lfloor K_{mm} \ K_{m(n-m)} \rfloor, \text{ and}$$

$$K_{nm} = \begin{bmatrix} K_{mm} \\ K_{(n-m)m} \end{bmatrix}.$$

Compared with the original prediction model $\hat{f}_* = K(x_*, X)[K(X,X) + \sigma_n^2 I]^{-1} y$, calculation complexity is reduced from $O(n^3)$ to $O(m^2 n)$ m<<n. It can be seen that, after the foregoing reduced rank approximation is used, model training complexity is greatly reduced, which also makes online update on the prediction model based on a new training sample simpler and more convenient.

Online update on the prediction model based on a new training sample may be implemented in the following manner: at first, a prediction model in a case of n historical samples is described using the following expression.

Assuming that $\alpha_n = [K_{mn}K_{nm} + \sigma_n^2 K_{mm}]^{-1} y$, a prediction model for a data flow length may be denoted as:

$$\hat{f}_* = K(x_*, X_m) \alpha_n; \text{ and}$$

when the $(n+1)^{th}$ data flow sample arrives, $\alpha_n$ needs to be correspondingly updated to $\alpha_{n+1}$.

$\alpha_{n+1} = [K_{m(n+1)} K_{(n+1)m} + \sigma_n^2 K_{mm}]^{-1} y_{n+1}$, and then, the following update formula is deduced using a Woodbury matrix inversion identity (Woodbury matrix inversion identity):

$$\Pi_{n+1} = (K_{m(n+1)} K_{(n+1)m} + \sigma_n^2 K_{mm})^{-1} = \Pi_n - \frac{\Pi_n k_{n+1} k_{n+1}^T \Pi_n}{1 + k_{n+1}^T \Pi_n k_{n+1}}$$

$$\Pi_n = (K_{mn} K_{nm} + \sigma_n^2 K_{mm})^{-1}$$

$$K_{(n+1)m} = \begin{bmatrix} K_{nm} \\ k_{n+1}^T \end{bmatrix}$$

$$\alpha_{n+1} = \left(I - \frac{\Pi_n k_{n+1} k_{n+1}^T}{1 + k_{n+1}^T \Pi_n k_{n+1}}\right) \alpha_n + y_{n+1} \left(I - \frac{\Pi_n k_{n+1} k_{n+1}^T}{1 + k_{n+1}^T \Pi_n k_{n+1}}\right) \Pi_n k_{n+1}$$

When length prediction needs to be performed on a new data flow, length prediction may be performed according to an updated prediction model:

$$\hat{f}_* = K(x_*, X_m) \alpha_{n+1}$$

The foregoing parameter optimization and online model update may enable a data flow to dynamically change according to a change of a network data flow, and a data flow length is predicted more accurately.

Moreover, a data flow length prediction function g may be also implemented using a Nadaraya-Watson estimator. A principle of the implementation is: a data flow length condition probability distribution function based on a data flow pattern vector is estimated by means of kernel density estimation, which is shown as follows:

$$\hat{f}_* = E[f_* | x = x_*] = \int f_* p(f_* | x_*) df_* = \frac{\int f_* p(f_*, x_*) df_*}{\int p(f_*, x_*) df_*}$$

where $x_*$ is a pattern vector of a to-be-predicted current data flow, and $f_*$ is a length of the to-be-predicted current data flow. Their joint probability density function may be obtained using a kernel density estimation method, which is shown as follows:

$$\hat{p}(x_*, f_*) = \sum_{i=1}^{n} K(x_*, x_i) K(f_*, y_i)$$

Herein, a definition of $K(x_*, x_i)$ is similar to that of the foregoing similarity function. Therefore, the following may be obtained:

$$\hat{f}_* = \frac{\sum_{i=1}^{n} K(x_*, x_i) y_i}{\sum_{i=1}^{n} K(x_*, x_i)} = \sum_{i=1}^{n} w_i y_i$$

It can be seen that, a Nadaraya-Watson estimator also predicts a length of a current to-be-predicted data flow by performing weighted combination on historical data flows, where the length has a weight of $$w_i = \frac{K(x_*, x_i)}{\sum_{i=1}^{n} K(x_*, x_i)}.$$

As described above, both the Gaussian process regression and the Nadaraya-Watson estimator may be used as an implementation example of training a prediction model. Principles of the both are: prediction is performed using a weighted combination of lengths of historical data flows, but different weight calculation formulas are used in different methods.

After the length of the current data flow is obtained by means of the prediction in step S205, a type of the current data flow may be determined by comparing the length of the data flow with a preset threshold, that is, the present application further includes the following step after step S205:

S207: Compare the predicted length of the current data flow with a preset threshold, and determine whether the current data flow is a large data flow or a small data flow according to a comparison result.

In this step, the type of the current data flow is determined mainly by comparing the predicted length of the current data flow with the threshold, and if the length is greater than the threshold, it is considered that the current data flow is a large data flow; otherwise, it is considered that the current data flow is a small data flow. It should be noted that, if the length of the current data flow is measured in a different measuring manner, for example, measured in a segmentation manner, for example, when the length of the current data flow is X bits, the length of the current data flow is recorded as M, and when the length of the current data flow is Y bits, where X>Y, the length of the current data flow is recorded as N, where N<M, the determining manners may be contrary, that is, if the length is less than the threshold, it is considered that the current data flow is a large data flow; otherwise, it is considered that the current data flow is a small data flow.

Figure 6:
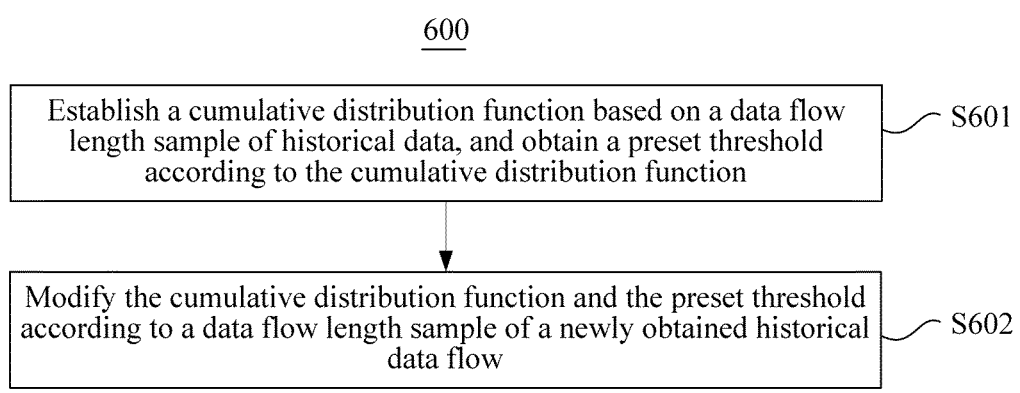
FIG. 6 is a schematic flowchart of a method for updating a threshold of data flow length prediction in a method for detecting a type of a network data flow according to an embodiment of the present application.

To enable a threshold to reflect, in real time, a situation of data transmitted in a network, the present application provides a method for performing real-time modification and update on the threshold according to a situation of a historical data flow in the network. Referring to FIG. 6, modification and update on the threshold include the following steps:

S601: Establish a cumulative distribution function based on a data flow length sample of historical data, and obtain the preset threshold according to the cumulative distribution function.

S602: Modify the cumulative distribution function and the preset threshold according to a data flow length sample of a newly obtained historical data flow.

For example, lengths $y_n$ of n historical data flows are collected. A cumulative distribution function $C_{y_n}(y)$ is established according to length values of these historical data flows. It is assumed that in an entire network, data flows that account for a proportion of p % are small data flows (mice flows), and the preset threshold is obtained by calculating $C_{y_n}(y_{TH})=p\%$, that is, $y_{TH}=C_{y_n}^{-1}(p\%)$.

When the $(n+1)^{th}$ data flow sample arrives, the cumulative distribution function is correspondingly modified into $C_{y_{n+1}}(y)$, and the threshold is updated: $y_{TH}=C_{y_{n+1}}^{-1}(p\%)$.

In the present application, feature extraction is performed on a header of a first data packet of a data flow, and then a pattern similarity between a current data flow and a historical data flow in a database is calculated, and a length of a new data flow is predicted according to the pattern similarity and a length of the historical data flow. It is determined, by comparing the predicted length with a threshold, whether the new data flow is a large data flow. Compared with the prior art, traffic statistics do not need to be collected on the data flow directly, which not only can determine a type of the data in real time, but also can improve determining precision, and therefore a size of the data flow can be estimated once the first data packet is received, thereby providing a reliable basis on which path planning is implemented in real time.

Figure 7:
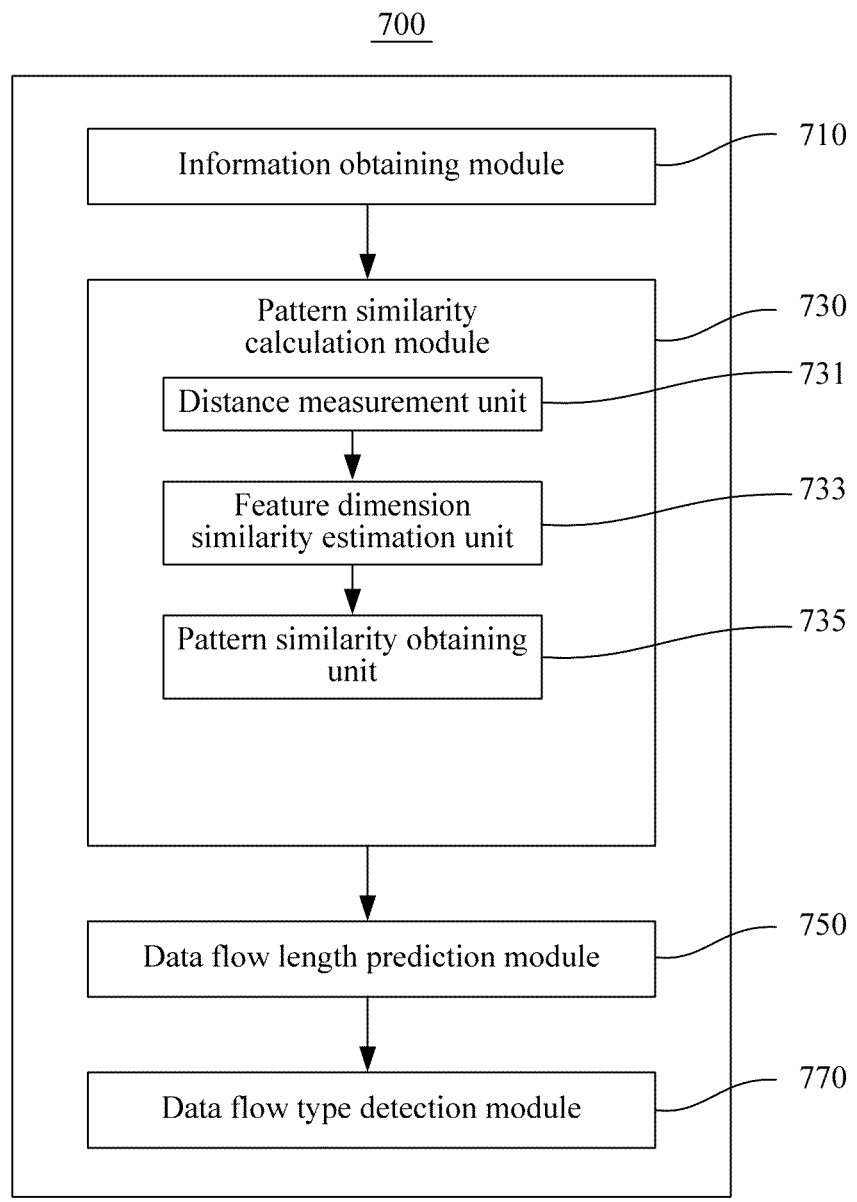
FIG. 7 is a structural block diagram of an apparatus for detecting a type of a data flow according to an embodiment of the present application.

FIG. 7 is a structural block diagram of an apparatus for detecting a type of a data flow according to an embodiment of the present application. The apparatus shown in FIG. 7 can perform FIG. 2, FIG. 3, and FIG. 6, that is, the steps included in the method for detecting a type of a data flow according to the present application. The apparatus 700 for detecting a type of a data flow shown in FIG. 7 may be disposed in the data transmission network shown in FIG. 1 for implementation.

The apparatus 700 for detecting a type of a data flow includes: an information obtaining module 710 and a pattern similarity calculation module 730.

The information obtaining module 710 is configured to obtain a header of a first data packet of a current data flow of a network, and obtain a pattern vector of the current data flow from the header, where the pattern vector includes at least one feature dimension, and the at least one feature dimension is selected from an information combination including a source IP address, a server port, a destination IP address, and a client port of the current data flow, a transmission time of the current data flow, and a transport protocol used by the current data flow.

The information obtaining module 710 is mainly configured to obtain related information for predicting a length of the current data flow, that is, the header of the first data packet of the data flow. The information obtaining module 710 may be a functional module in the network switch 130 in FIG. 1, that is, be implemented using the network switch 130. The information obtaining module 710 may be also an independent software or hardware execution module disposed in a network node and having autonomous detection and reporting capabilities, and the execution module can start an information obtaining function when a new data flow arrives, to obtain needed information about the data flow, report the obtained information to a next processing module, and may implement all steps and functions described in S201.

The pattern similarity calculation module 730 is configured to compare the at least one feature dimension in the pattern vector of the current data flow with a corresponding feature dimension in a pattern vector of at least one historical data flow, so as to obtain at least one pattern similarity of the current data flow, where the at least one pattern similarity of the current data flow and the pattern vector of the at least one historical data flow are in a one-to-one correspondence, and the pattern vector of the historical data flow is pre-stored in a database.

After the information obtaining module 710 obtains the header of the first data packet of the current data flow of the network, and obtains the pattern vector of the current data flow from the header, the pattern vector of the current data flow is transmitted to the pattern similarity calculation module 730, and the pattern similarity calculation module 730 calculates a pattern similarity according to information fed back by the information obtaining module 710. For a specific process of calculating the pattern similarity, reference may be made to description about step S203 in the foregoing method, and the module can implement all steps and functions described in S203. The pattern similarity calculation module 730 may perform execution using the prediction server 160 in FIG. 1, that is, calculate a pattern similarity according to the pattern vector using the processor in the prediction server 160 by invoking a pattern similarity calculation program stored in the memory. Moreover, the pattern similarity calculation module 730 may be also implemented using an ASIC, a FPGA or another programmable logical device, a discrete gate or transistor logical device, or a discrete hardware component. The pattern similarity calculation module 730 further includes: a distance measurement unit 731 configured to estimate a distance measure between the at least one feature dimension in the pattern vector of the current data flow and the corresponding feature dimension in the pattern vector of the at least one historical data flow; a feature dimension similarity estimation unit 733 configured to estimate a feature dimension similarity corresponding to the at least one feature dimension in the pattern vector of the current data flow according to the obtained distance measure between the at least one feature dimension in the pattern vector of the current data flow and the corresponding feature dimension in the pattern vector of the at least one historical data flow; and a pattern similarity obtaining unit 735 configured to obtain the at least one pattern similarity of the current data flow according to the feature dimension similarity.

The module 700 for detecting a type of data according to the present application further includes: a data flow length prediction module 750 and a data flow type detection module 770.

The data flow length prediction module 750 is configured to predict a length of the current data flow according to the at least one pattern similarity of the current data flow and a length of the corresponding at least one historical data flow, where the length of the at least one historical data flow is pre-stored in the database, and the length of the at least one historical data flow and the pattern vector of the at least one historical data flow are in a one-to-one correspondence.

Once the pattern similarity calculation module 730 obtains a pattern similarity by means of calculation, the data flow length prediction module 750 may predict a data flow length according to the pattern similarity. For a specific prediction process, reference may be made to specific description about step S205 in the foregoing method, and the module can implement all steps and functions described in S205. The data flow length prediction module 750 may perform execution using the central control server 110 in FIG. 1, that is, calculate a pattern similarity according to the pattern vector using the processor in the prediction server 160 by invoking a pattern similarity calculation program stored in the memory. Moreover, the pattern similarity calculation module 730 may be also implemented using an ASIC, an FPGA or another programmable logical device, a discrete gate or transistor logical device, or a discrete hardware component.

The data flow type detection module 770 is configured to compare the predicted length of the current data flow with a preset threshold, and determine whether the current data flow is a large data flow or a small data flow according to a comparison result.

After the data flow length prediction module 750 feeds back the predicted data flow length of the current data flow to the data flow type detection module 770, the data flow type detection module 770 compares the data flow length with the threshold, so as to determine the type of the data flow. For a specific comparison process, reference may be made to description about step S207 in the method of the present application, and the module can implement all steps and functions described in S207.

In the apparatus 700 for detecting a type of a data flow according to the present application, feature extraction is performed on a header of a first data packet of a data flow, and then a pattern similarity between a current data flow and a historical data flow in a database is calculated, and a length of a new data flow is predicted according to the pattern similarity and a length of the historical data flow. It is determined, by comparing the predicted length with a threshold, whether the new data flow is a large data flow. Compared with the prior art, traffic statistics do not need to be collected on the data flow directly, which not only can determine a type of the data in real time, but also can improve determining precision, and therefore a size of the data flow can be estimated once the first data packet is received, thereby providing a reliable basis on which path planning is implemented in real time.

Figure 8:
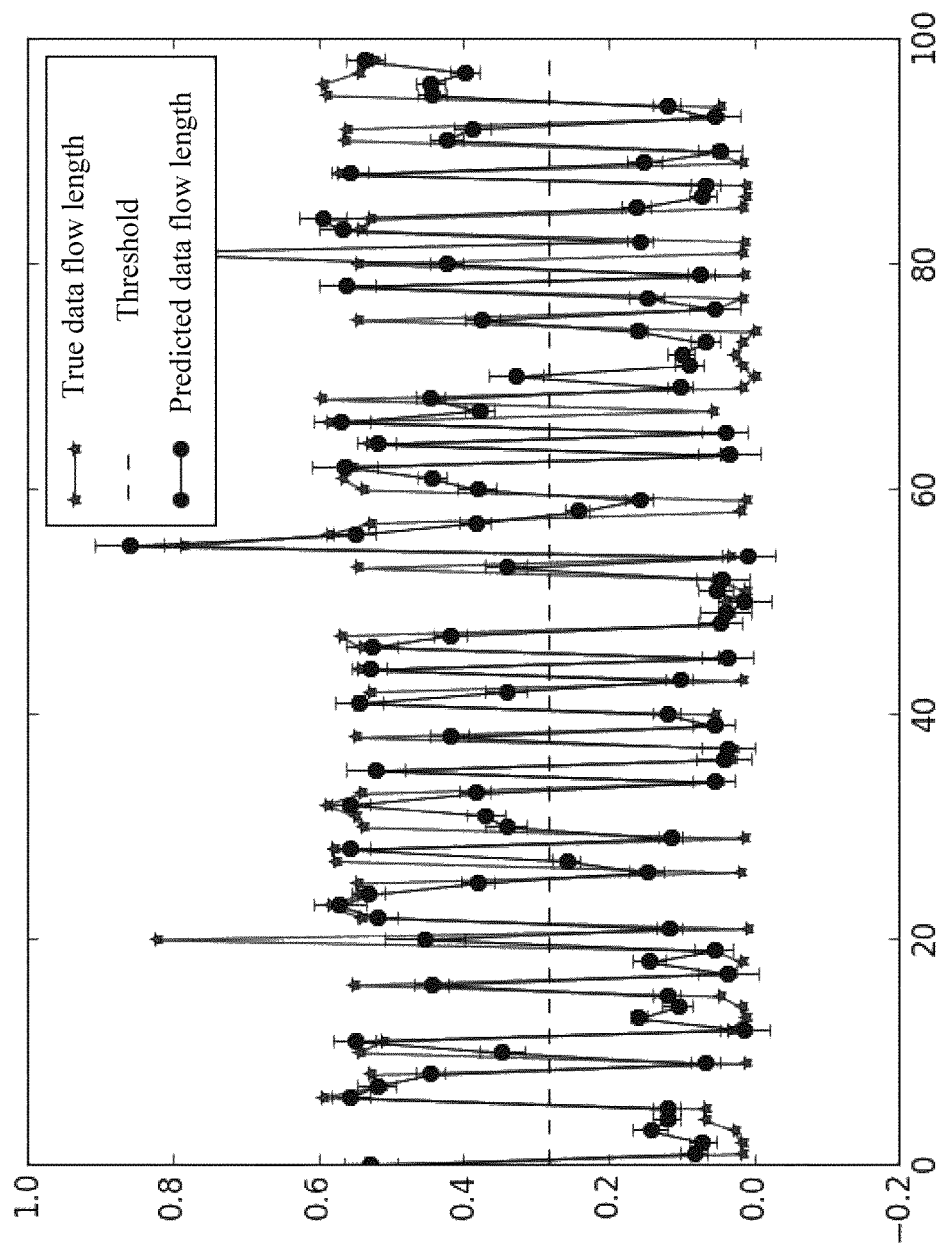
FIG. 8 is a schematic diagram of a test result of a method and an apparatus for detecting a type of a data flow according to an embodiment of the present application.

Reference may be made to FIG. 8, which is a schematic diagram of a result of detecting a type of a data flow using a method and an apparatus for detecting a type of a data flow according to an embodiment of the present application. A star-shaped connection curve is used for representing a true flow length of a data flow in a test process, and a dot-shaped connection curve is used for representing a predicted value of a data flow length, of a data flow, obtained using a prediction model in the method and the apparatus of the present application in a test process. It can be seen from the test result that, a model prediction result used in the method and the apparatus provided in the present application is very coincident with a true data flow length. A black dashed line is a threshold for distinguishing large data flows (elephant flows) and small data flows (mice flows). Classification is performed on the large data flows and the small data flows according to the threshold, a true positive rate of the classification is 97.87%, where the true positive rate denotes a proportion at which true large data flows are accurately classified as large data flows, and a false positive rate is 5.78%, where the false positive rate denotes a proportion at which small data flows are inaccurately classified as large data flows. From a viewpoint of the result, the method and the apparatus of the present application can detect a type of a data flow very accurately.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts shown as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such understanding, the technical solutions of the present application essentially, or the part contributing to the prior art, or some of the technical solutions may be implemented in a form of a software product. The software product is stored in a storage medium and includes several instructions for instructing a computer device (which may be a personal computer, a server, or a network device) or a processor to perform all or some of the steps of the methods described in the embodiments of the present application. The foregoing storage medium includes: any medium that can store program code, such as a universal serial bus (USB) flash drive, a removable hard disk, a ROM, a RAM, a magnetic disk, or an optical disc.

The foregoing descriptions are merely specific embodiments of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for detecting a type of a data flow, comprising:
    obtaining a header of a first data packet of a current data flow;
    obtaining a pattern vector of the current data flow from the header of the first data packet, the pattern vector comprising at least one feature dimension, and the at least one feature dimension being selected from an information combination comprising a source Internet Protocol (IP) address, a server port, a destination IP address, a client port of the current data flow, a transmission time of the current data flow, or a transport protocol used by the current data flow;
    comparing the at least one feature dimension in the pattern vector of the current data flow with a corresponding feature dimension in a pattern vector of at least one historical data flow in order to obtain at least one pattern similarity of the current data flow, the at least one pattern similarity of the current data flow and the pattern vector of the at least one historical data flow being in a one-to-one correspondence, and the pattern vector of the historical data flow being pre-stored in a database;
    predicting a length of the current data flow according to the at least one pattern similarity of the current data flow and a length of the corresponding at least one historical data flow, the length of the at least one historical data flow being pre-stored in the database, and the length of the at least one historical data flow and the pattern vector of the at least one historical data flow being in a one-to-one correspondence;
    comparing the predicted length of the current data flow with a preset threshold; and
    determining whether the current data flow is a large data flow or a small data flow according to a comparison result,
    wherein comparing the at least one feature dimension in the pattern vector of the current data flow with the corresponding feature dimension in the pattern vector of the at least one historical data flow in order to obtain the at least one pattern similarity of the current data flow comprises:
        separately estimating an IP address distance measure, a port distance measure, a transmission time distance measure, and a transport protocol distance measure between the at least one feature dimension in the pattern vector of the current data flow and the corresponding feature dimension in the pattern vector of the at least one historical data flow;
        separately estimating an IP address similarity, a port similarity, a transmission time similarity, and a transport protocol similarity that are corresponding to the at least one feature dimension in the pattern vector of the current data flow according to the IP address distance measure, the port distance measure, the transmission time distance measure, and the transport protocol distance measure;
        obtaining at least one pattern similarity of the current data flow according to the feature dimension similarity, the at least one pattern similarity, and the at least one historical data flow being in a one-to-one correspondence, and wherein the IP address similarity, the port similarity, the transmission time similarity, and the transport protocol similarity are obtained using the following formula:

$$k_f(x_{1,f}, x_{2,f}, \theta_f) = \exp\left[-\frac{d_f(x_{1,f}, x_{2,f})}{\theta_f}\right],$$

$k_f(x_{1,f}, x_{2,f}, \theta_f)$ being the feature dimension similarity, $x_{1,f}$ being one of the at least one feature dimension in the pattern vector of the current data flow, $x_{2,f}$ being a feature dimension, in the pattern vector of the historical data flow, corresponding to one of the at least one feature dimension in the pattern vector of the current data flow, $\theta_f$ being a parameter of a similarity function of one of the at least one feature dimension, a value of the parameter deciding a speed at which the similarity function decreases as a distance measure increases, and also deciding a weight that the feature dimension accounts for in data flow length prediction, $$f \in \underline{\{src\_ip, src\_prt, dest\_ip, dest\_prt, prtcl, t\}},$$
$$F$$

F being a dimension t corresponding to the feature dimension in the pattern sector of the current data flow and corresponding to the corresponding feature dimension in the pattern vector of the historical data flow, src ip being a source IP address of the current data flow or a source IP address of the historical data flow, src prt being a server port of the current flow or a server port of the historical data flow, dest ip being a destination IP address of the current flow or a destination IP address of the historical data flow, dest prt being a client port of the current flow or a client port of the historical data flow, prtcl being a protocol used by the current flow or a protocol used by the historical data flow, and t being a time at which the current flow is sent or a time at which the historical data flow is sent.

2. The method of claim 1, wherein the IP address distance measure is obtained using the following formula:

$$d_{ip}(x_{1,ip}, x_{2,ip}) = \log\frac{33}{LPL(x_{1,ip}, x_{2,ip}) + 1},$$

$x_{1,ip}$ being the source IP address or the destination IP address of the current data flow, $x_{2,ip}$ being the source IP address or the destination IP address of the historical data flow, $d_{ip}(x_{1,ip},x_{2,ip})$ being the IP address distance measure, $LPL(x_{1,ip},x_{2,ip})$ being a longest prefix length between the source IP address or the destination IP address of the current data flow and the source IP address or the destination IP address of the historical data flow, the port distance measure being obtained using the following formula:

$$d_{prt}(x_{1,port}, x_{2,port}) = \begin{cases} 0 & \text{if } x_{1,port} = x_{2,port} \\ 1 & \text{if } \delta_{port}(x_{1,port}) = \delta_{port}(x_{2,port}) \\ 2 & \text{if } \delta_{port}(x_{1,port}) \in \{0,1\} \ \& \ \delta_{port}(x_{2,port}) \in \{0,1\} \\ 4 & \text{if } \delta_{port}(x_{1,port}) \in \{0,1\} \ \& \ \delta_{port}(x_{2,port}) = 2 \mid \delta_{port}(x_{1,port}) = 2 \ \& \ \delta_{port}(x_{2,port}) \in \{0,1\} \end{cases}$$

$x_{1,port}$ being the server port or the client port of the current data flow, $x_{2,port}$ being the server port or the client port of the historical data flow, $d_{prt}(x_{1,port},x_{2,port})$ being the port distance measure, $\delta_{port}(x)$ being obtained using the following formula:

$$\delta_{port}(x) = \begin{cases} 0 & \text{if } x \in [0,1023] \\ 1 & \text{if } x \in [1024,49151] \\ 2 & \text{if } x \in [49152,65535] \end{cases}$$

$\delta_{port}(x)$ being a value assigned to a range type to which the server port or the client port belongs, x being a value of the server port or the client port, the transmission time distance measure being obtained using the following formula:

$$d_t(x_{1,t}, x_{2,t}) = |x_{1,t} - x_{2,t}|,$$

$x_{1,t}$ denoting the transmission time of the current data flow, $x_{2,t}$ denoting the transmission time of the historical data flow, $d_t(x_{1,t}, x_{2,t})$ denoting the transmission time distance measure, the transport protocol distance measure being obtained using the following formula:

$$d_{prtcl}(x_{1,prtcl}, x_{2,prtcl}) = \|x_{1,prtcl} - x_{1,prtcl}\|_2,$$

$x_{1,prtcl}$ being the transport protocol used by the current data flow, $x_{2,prtcl}$ being the protocol used by the historical data flow, and $d_{prtcl}(x_{1,prtcl}, x_{2,prtcl})$ being the transport protocol distance measure.

3. The method of claim 1, wherein separately estimating the IP address similarity, the port similarity, the transmission time similarity, and the transport protocol similarity that are corresponding to the at least one feature dimension in the pattern vector of the current data flow according to the IP address distance measure, the port distance measure, the transmission time distance measure, and the transport protocol distance measure comprises separately estimating the IP address similarity, the port similarity, the transmission time similarity, and the transport protocol similarity that are corresponding to the at least one feature dimension in the pattern vector of the current data flow according to the IP address distance measure, the port distance measure, the transmission time distance measure, and the transport protocol distance measure, by following a rule that a smaller distance measure between feature dimensions indicates a higher feature dimension similarity.

4. The method of claim 1, wherein obtaining the at least one pattern similarity of the current data flow according to the feature dimension similarity comprises:

using, according to a weight corresponding to the at least one feature dimension in the pattern vector of the current data flow, a feature dimension similarity corresponding to the feature dimension whose weight is highest of the at least one feature dimension in the pattern vector of the current data flow, as the at least one pattern similarity of the current data flow; or using, according to a weight corresponding to the at least one feature dimension in the pattern vector of the current data flow, a feature dimension similarity on which weighted combination is performed and that corresponds to the at least one feature dimension in the pattern vector of the current data flow, as the at least one pattern similarity of the current data flow.

5. The method of claim 1, wherein predicting the length of the current data flow according to the at least one pattern similarity of the current data flow and the length of the corresponding at least one historical data flow comprises performing weighted combination on the length of the at least one historical data flow corresponding to the at least one pattern similarity according to the at least one pattern similarity of the current data flow to predict the length of the current data flow, a weight of the length of the historical data flow when the weighted combination is performed being decided by the at least one pattern similarity corresponding to the at least one historical data flow.

6. The method of claim 5, wherein performing weighted combination on the length of the at least one historical data flow corresponding to the at least one pattern similarity according to the at least one pattern similarity of the current data flow to predict the length of the current data flow comprises predicting the length of the current data flow using the following formula:

$$\hat{f}_* = \sum_{i=1}^{n} w_i y_i,$$

$\hat{f}_*$ being the predicted length of the current data flow, $w_i$ being a weight factor, whose size depends on the $i^{th}$ pattern similarity of the at least one pattern similarity of the current data flow, and the $i^{th}$ pattern similarity being a pattern similarity between the pattern vector of the current data flow and a pattern vector of the $i^{th}$ historical data flow of the at least one historical data flow, and $y_i$ being a length of the $i^{th}$ historical data flow of the at least one historical data flow.

7. The method of claim 6, wherein the weighting factor $w_i$ is obtained using the following formula:

$$w_i = g(K(x_*, x_i, \Theta)),$$

g being a prediction model, $K(x_*, x_i, \Theta)$ being the $i^{th}$ pattern similarity, $\Theta$ being a vector that is obtained by means of training and that represents a transmission behavior pattern of the historical data flow in a network, $\Theta = [\theta_{src\_ip}\ \theta_{src\_prt} \ldots \theta_{at}\ \theta_{pt}\ \overline{\omega}_t]$, $\theta_{src\_ip}$ representing source IP address weights in a transmission behavior pattern, $\theta_{src\_prt}$ representing server port weights in a transmission behavior pattern, $\theta_{at}$ representing non-periodic weights in a transmission behavior pattern, $\theta_{pt}$ representing periodic weights in a transmission behavior pattern, $\overline{\omega}_1$ representing a period in which a user sends a data flow, $x_*$ being the pattern vector of the current data flow, and $x_i$ being the pattern vector of the $i^{th}$ historical data flow of the at least one historical data flow.

8. The method of claim 7, wherein the prediction model g is updated in real time according to a pattern vector and a length of a newly obtained historical data flow.

9. The method of claim 5, wherein performing weighted combination on the length of the at least one historical data flow corresponding to the at least one pattern similarity according to the at least one pattern similarity of the current data flow to predict the length of the current data flow comprises predicting the length of the current data flow using the following formula:

$$\hat{f}_* = K(x_*, X_m)[K_{mn}K_{nm} + \sigma_n^2 K_{mm}]^{-1} K_{mn} y,$$

$x_*$ being the pattern vector of the current data flow, $X_m$ being a pattern vector of a historical data flow subset of the at least one historical data flow, and the subset comprising m historical data flows, $K(x_*, X_m)$ denoting a pattern similarity between the current data flow and the historical data flow subset, $K_{mn}$, $K_{mm}$, and $K_{nm}$ being submodules in a pattern similarity matrix K of the historical data flow, $$K = \begin{bmatrix} K_{mm} & K_{m(n-m)} \\ K_{(n-m)m} & K_{(n-m)(n-m)} \end{bmatrix},$$

$$K_{mn} = [K_{mm} \; K_{m(n-m)}],$$

$$K_{nm} = \begin{bmatrix} K_{mm} \\ K_{(n-m)m} \end{bmatrix},$$

an element of the $i^{th}$ row and the $j^{th}$ column of the pattern similarity matrix K of the historical data flow denoting a pattern similarity between the $i^{th}$ historical data flow and the $j^{th}$ historical data flow in the historical data flow subset, y being a flow length of a historical data flow, and $\sigma_n^2$ denoting a model noise variance.

10. The method of claim 5, wherein the formula $\hat{f}_* = K(x_*, X_m)[K_{nm}K_{nm} + \sigma_n^2 K_{mm}]^{-1} K_{mn} y$ used for predicting the length of the current data flow is updated in real time according to a pattern vector and a length of a newly obtained historical data flow to:

$$\hat{f}_* = K(x_*, X)\alpha_{n+1},$$

$$\alpha_{n+1} = \left(I - \frac{\Pi_n k_{n+1} k_{n+1}^T}{1 + k_{n+1}^T \Pi_n k_{n+1}}\right)\alpha_n + y_{n+1}\left(I - \frac{\Pi_n k_{n+1} k_{n+1}^T}{1 + k_{n+1}^T \Pi_n k_{n+1}}\right)\Pi_n k_{n+1},$$

$$K_{(n+1)m} = \begin{bmatrix} K_{nm} \\ k_{n+1}^T \end{bmatrix},$$

$$\Pi_n = (K_{mn}K_{nm} + \sigma_n^2 K_{mm})^{-1},$$

$$\Pi_{n+1} = (K_{m(n+1)}K_{(n+1)m} + \sigma_n^2 K_{mm})^{-1} = \Pi_n - \frac{\Pi_n k_{n+1} k_{n+1}^T \Pi_n}{1 + k_{n+1}^T \Pi_n k_{n+1}},$$

$$\alpha_n = [K_{mn}K_{nm} + \sigma_n^2 K_{mm}]^{-1} y,$$

and
I is an identity matrix.

11. The method of claim 1, wherein the threshold is updated in real time according to a newly obtained historical data flow.

12. The method of claim 11, wherein updating the threshold in real time according to the newly obtained historical data flow is implemented by:
establishing a cumulative distribution function based on a data flow length sample of the historical data flow;
obtaining the preset threshold according to the cumulative distribution function, the historical data flow comprising the at least one historical data flow corresponding to the at least one pattern similarity of the current data flow; and
modifying the cumulative distribution function and the preset threshold according to a data flow length sample of the newly obtained historical data flow.

13. An apparatus for detecting a type of a data flow, comprising:
a memory storing executable instructions; and
a processor coupled to the memory and configured to:
obtain a header of a first data packet of a current data flow;
obtain a pattern vector of the current data flow from the header, the pattern vector comprising at least one feature dimension, and the at least one feature dimension being selected from an information combination comprising a source internet protocol (IP) address, a server port, a destination IP address, a client port of the current data flow, a transmission time of the current data flow, or a transport protocol used by the current data flow;
compare the at least one feature dimension in the pattern vector of the current data flow with a corresponding feature dimension in a pattern vector of at least one historical data flow in order to obtain at least one pattern similarity of the current data flow, the at least one pattern similarity of the current data flow and the pattern vector of the at least one historical data flow being in a one-to-one correspondence, and the pattern vector of the historical data flow being pre-stored in a database;
predict a length of the current data flow according to the at least one pattern similarity of the current data flow and a length of the corresponding at least one historical data flow, the length of the at least one historical data flow being pre-stored in the database, and the length of the at least one historical data flow and the pattern vector of the at least one historical data flow being in a one-to-one correspondence;
compare the predicted length of the current data flow with a preset threshold;
determine whether the current data flow is a large data flow or a small data flow according to a comparison result;
separately estimate an IP address distance measure, a port distance measure, a transmission time distance measure, and a transport protocol distance measure between the at least one feature dimension in the pattern vector of the current data flow and the corresponding feature dimension in the pattern vector of the at least one historical data flow;
separately estimate an IP address similarity, a port similarity, a transmission time similarity and a transport protocol similarity that are corresponding to the at least one feature dimension in the pattern vector of the current data flow according to the IP address distance measure, the port distance measure, the transmission time distance measure, and the transport protocol distance measure; and
obtain the at least one pattern similarity of the current data flow according to the feature dimension similarity, the at least one pattern similarity and the at least one historical data flow being in a one-to-one correspondence, and wherein the IP address similarity, the port similarity, the transmission time similarity, and the transport protocol similarity are obtained using the following formula:

$$k_f(x_{1,f}, x_{2,f}, \theta_f) = \exp\left[-\frac{d_f(x_{1,f}, x_{2,f})}{\theta_f}\right],$$

$k_f(x_{1,f}, x_{2,f}, \theta_f)$ being the feature dimension similarity, $x_{1,f}$ being one of the at least one feature dimension in the pattern vector of the current data flow, $x_{2,f}$ being a feature dimension, in the pattern vector of the historical data flow, corresponding to one of the at least one feature dimension in the pattern vector of the current data flow. $\theta_f$ being a parameter of a similarity function of one of the at least one feature dimension, a value of the parameter deciding a speed at which the similarity function decreases as a distance measure increases, and also deciding a weight that the feature dimension accounts for in data flow length prediction, $$f \in \underbrace{\{src\_ip, src\_prt, dest\_ip, dest\_prt, prtcl, t\}}_{F},$$

F being a dimension t corresponding to the feature dimension in the pattern vector of the current data flow and corresponding to the corresponding feature dimension in the pattern vector of the historical data flow, src ip being a source IP address of the current data flow or a source IP address of the historical data flow, src prt being a server port of the current flow or a server port of the historical data flow, dest ip being a destination IP address of the current flow or a destination IP address of the historical data flow, dest prt being a client port of the current flow or a client port of the historical data flow, prtcl being a protocol used by the current flow or a protocol used by the historical data flow, and t being a time at which the current flow is sent or a time at which the historical data flow is sent.

14. The apparatus of claim 13, wherein the IP address distance measure is obtained using the following formula:

$$d_{ip}(x_{1,ip}, x_{2,ip}) = \log\frac{33}{LPL(x_{1,ip}, x_{2,ip}) + 1},$$

$x_{1,ip}$ being the source IP address or the destination IP address of the current data flow, $x_{2,ip}$ being the source IP address or the destination IP address of the historical data flow, $d_{ip}(x_{1,ip}, x_{2,ip})$ being the IP address distance measure, LPL $(x_{1,ip}, x_{2,ip})$ being a longest prefix length between the source IP address or the destination IP address of the current data flow and the source IP address or the destination IP address of the historical data flow, the port distance measure being obtained using the following formula:

$$d_{prt}(x_{1,port}, x_{2,port}) = \begin{cases} 0 & \text{if } x_{1,port} = x_{2,port} \\ 1 & \text{if } \delta_{port}(x_{1,port}) = \delta_{port}(x_{2,port}) \\ 2 & \text{if } \delta_{port}(x_{1,port}) \in \{0,1\} \ \& \ \delta_{port}(x_{2,port}) \in \{0,1\}, \\ 4 & \text{if } \delta_{port}(x_{1,port}) \in \{0,1\} \ \& \ \delta_{port}(x_{2,port}) = \\ & 2 \mid \delta_{port}(x_{1,port}) = 2 \ \& \ \delta_{port}(x_{2,port}) \in \{0,1\} \end{cases}$$

$x_{1,port}$ being the server port or the client port of the current data flow, $x_{2,port}$ being the server port or the client port of the historical data flow, $d_{prt}(x_{1,port}, x_{2,port})$ being the port distance measure, $\delta_{port}(x)$ being obtained using the following formula:

$$\delta_{port}(x) = \begin{cases} 0 & \text{if } x \in [0,1023] \\ 1 & \text{if } x \in [1024,49151] \\ 2 & \text{if } x \in [49152,65535] \end{cases},$$

$\delta_{port}(x)$ being a value assigned to a range type to Which the server port or the client port belongs, x being a value of the server port or the client port, the transmission time distance measure being obtained using the following formula:

$$d_t(x_{1,t}, x_{2,t}) = |x_{1,t} - x_{2,t}|,$$

$x_{1,t}$ denoting the transmission time of the current data flow, $x_{2,t}$ denoting the transmission time of the historical data flow, $d_t(x_{1,t}, x_{2,t})$ denoting the transmission time distance measure, the transport protocol distance measure being obtained using the following formula:

$$d_{prtcl}(x_{1,prtcl}, x_{2,prtcl}) = \|x_{1,prtcl} - x_{1,prtcl}\|_2,$$

$x_{1,prtcl}$ being the transport protocol used by the current data flow, $x_{2,prtcl}$ being the protocol used by the historical data flow, and $d_{prtcl}(x_{1,prtcl}, x_{2,prtcl})$ being the transport protocol distance measure.

* * * * *

UNITED STATES PATENT AND TRADEMARK OFFICE
CERTIFICATE OF CORRECTION

| | | |
|---|---|---|
| PATENT NO. | : 10,333,854 B2 | Page 1 of 1 |
| APPLICATION NO. | : 15/465757 | |
| DATED | : June 25, 2019 | |
| INVENTOR(S) | : Zhitang Chen, Yanhui Geng and Pascal Poupart | |

It is certified that error appears in the above-identified patent and that said Letters Patent is hereby corrected as shown below:

On the Title Page

Item (30): "2015 1 0003825" should read "2015 1 0003825.3"

In the Claims

Claim 1, Column 38, Line 45: "sector" should read "vector"

Claim 7, Column 40, Line 61: "$\varpi^{(t)}_1$" should read "$\varpi_t$"

Claim 10, Column 41, Line 37: "$K_{nm}$" should read "$K_{mn}$"

Claim 13, Column 43, Line 12: "current data flow." should read "current data flow,"

Claim 14, Column 44, Line 13: "type to Which" should read "type to which"

Signed and Sealed this
Twenty-seventh Day of August, 2019

Andrei Iancu
*Director of the United States Patent and Trademark Office*